US010706843B1

(12) United States Patent
Elangovan et al.

(10) Patent No.: US 10,706,843 B1
(45) Date of Patent: Jul. 7, 2020

(54) CONTACT RESOLUTION FOR COMMUNICATIONS SYSTEMS

(71) Applicant: Amazon Technologies, Inc., Seattle, WA (US)

(72) Inventors: Someshwaran Elangovan, Tamil Nadu (IN); Aparna Nandyal, Tamil Nadu (IN); Venkatesh Kancharla, Chennai (IN); Arun Rajendran, Tamil Nadu (IN); Sumedha Arvind Kshirsagar, Seattle, WA (US); Christopher Geiger Parker, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 269 days.

(21) Appl. No.: 15/454,832

(22) Filed: Mar. 9, 2017

(51) Int. Cl.
| | |
|---|---|
| *G10L 15/22* | (2006.01) |
| *G10L 15/18* | (2013.01) |
| *G10L 15/06* | (2013.01) |
| *H04M 1/27* | (2006.01) |
| *G06F 16/14* | (2019.01) |
| *H04L 29/12* | (2006.01) |
| *G10L 15/26* | (2006.01) |

(52) U.S. Cl.
CPC ............ *G10L 15/22* (2013.01); *G06F 16/156* (2019.01); *G10L 15/063* (2013.01); *G10L 15/1815* (2013.01); *G10L 15/265* (2013.01); *H04L 61/1594* (2013.01); *H04M 1/271* (2013.01); *G10L 2015/0635* (2013.01); *G10L 2015/221* (2013.01); *G10L 2015/223* (2013.01); *G10L 2015/225* (2013.01)

(58) Field of Classification Search
CPC ............... G10L 15/22; G10L 2015/221; G10L 2015/225; G10L 15/26; G10L 15/265; G10L 2015/223; G06F 16/156; H04L 61/1594
See application file for complete search history.

(56) References Cited

U.S. PATENT DOCUMENTS

| | | | | | |
|---|---|---|---|---|---|
| 6,804,330 | B1 * | 10/2004 | Jones | .................. | H04M 3/4938 |
| | | | | | 379/88.01 |
| 7,555,428 | B1 * | 6/2009 | Franz | .................... | G06F 17/277 |
| | | | | | 704/10 |

(Continued)

OTHER PUBLICATIONS

The Examiner's attention is hereby drawn to the specification and file history of co-pending U.S. Appl. No. 15/454,853, entitled "Messaging Account Disambiguation", filed Mar. 9, 2017, which may contain information relevant to the present application.

*Primary Examiner* — Eric Yen
(74) *Attorney, Agent, or Firm* — Pierce Atwood LLP

(57) ABSTRACT

Methods and systems for performing contact resolution are described herein. When initiating a communications session using a voice activated electronic device, a contact name may be resolved to determine an appropriate contact with which the communications session may be directed to. Contacts from an individual's contact list may be queried to determine a listing of probable contacts associated with the contact name, and contact identifiers associated with the contact may be determined. Using one or more rules for disambiguating between similar contact names, a single contact may be identified, and a communications session with that contact may be initiated.

19 Claims, 8 Drawing Sheets

(56) References Cited

U.S. PATENT DOCUMENTS

| | | | | |
|---|---|---|---|---|
| 8,430,310 B1* | 4/2013 | Ho | G06F 21/35 | 235/382 |
| 8,489,398 B1* | 7/2013 | Gruenstein | G10L 15/08 | 704/231 |
| 8,862,467 B1* | 10/2014 | Casado | G10L 15/22 | 704/231 |
| 2002/0035474 A1* | 3/2002 | Alpdemir | G06Q 30/02 | 704/270 |
| 2002/0099544 A1* | 7/2002 | Levitt | G10L 15/1815 | 704/247 |
| 2005/0175159 A1* | 8/2005 | Cooper | G10L 15/1815 | 379/88.03 |
| 2005/0177376 A1* | 8/2005 | Cooper | G10L 15/065 | 704/277 |
| 2006/0035632 A1 | 2/2006 | Sorvari | | |
| 2006/0179410 A1* | 8/2006 | Deeds | H04L 51/04 | 715/750 |
| 2007/0127640 A1* | 6/2007 | Brunel | G10L 15/26 | 379/88.13 |
| 2007/0140532 A1* | 6/2007 | Goffin | G06K 9/00288 | 382/118 |
| 2008/0091406 A1* | 4/2008 | Baldwin | G10L 15/1815 | 704/4 |
| 2008/0312928 A1* | 12/2008 | Goebel | G10L 15/26 | 704/255 |
| 2009/0248415 A1* | 10/2009 | Jablokov | G10L 15/30 | 704/251 |
| 2011/0034156 A1 | 2/2011 | Gatti | | |
| 2011/0087730 A1* | 4/2011 | Li | G06F 9/44521 | 709/203 |
| 2011/0184730 A1* | 7/2011 | LeBeau | G10L 15/30 | 704/201 |
| 2012/0265528 A1* | 10/2012 | Gruber | G10L 15/18 | 704/235 |
| 2013/0189961 A1 | 7/2013 | Channakeshava | | |
| 2014/0088952 A1* | 3/2014 | Fife | G06F 17/27 | 704/9 |
| 2014/0222436 A1* | 8/2014 | Binder | G10L 15/265 | 704/275 |
| 2014/0236598 A1* | 8/2014 | Fructuoso | G10L 13/04 | 704/249 |
| 2014/0365226 A1* | 12/2014 | Sinha | G10L 25/00 | 704/275 |
| 2015/0279365 A1* | 10/2015 | Sharifi | G10L 15/26 | 704/235 |

\* cited by examiner

CONTACT RESOLUTION FOR COMMUNICATIONS SYSTEMS

BACKGROUND

Electronic devices are being used more and more with each passing day. Some electronic devices allow one individual to communicate with one or more additional individual.

DETAILED DESCRIPTION

Figure 1:
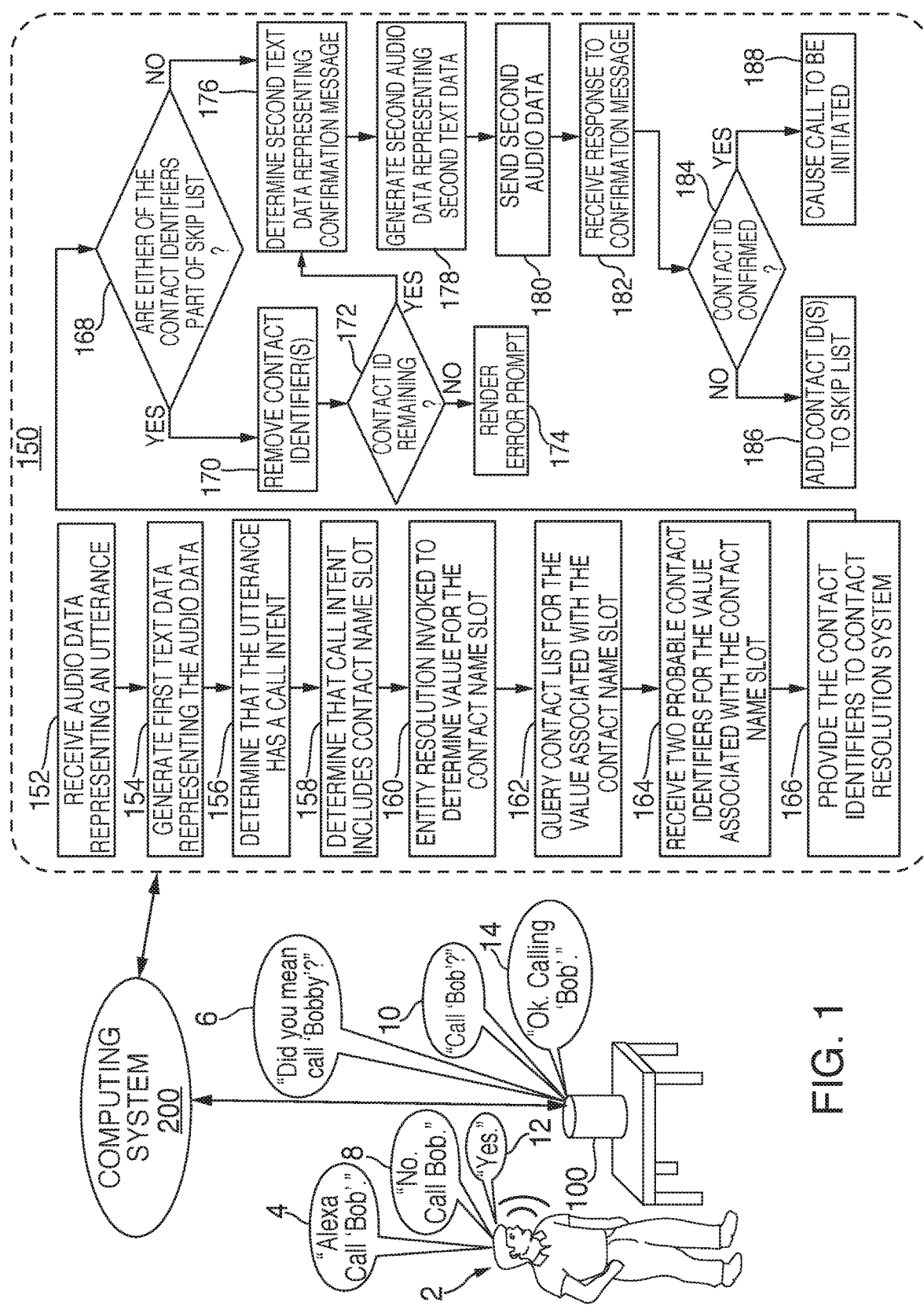
FIG. 1 is an illustrative diagram of an exemplary system for resolving a contact using a voice activated electronic device, in accordance with various embodiments.

The present disclosure, as set forth below, is generally directed to various embodiments of methods and systems for resolving contacts for communications systems. In particular, identifying a particular contact from a spoken utterance is described herein. In some embodiments, disambiguation between two or more contacts identified by contact resolution may be performed. Additionally, disambiguation between two or more contacts that may have, or may be identified by, a substantially same identifier, may be performed in order to resolve a particular contact.

In a non-limiting example embodiment, an individual may attempt to communicate with another individual using their electronic device. For example, an individual may speak an utterance (e.g., "Call 'Bob'," or "Call 'Bob's home'") to their voice activated electronic device requesting that a call be made to one of the individual's contacts. The electronic device may be configured to record and send audio data representing the utterance to a speech-processing system, which may be tasked with determining what was uttered, what was intended by the utterance, and what, if any, actions should be performed in response. For instance, in one embodiment, the intent of the utterance, "Call <Contact Name>," may be for a call to be made to a particular contact. The speech-processing system may then communicate with a communications system to invoke a call function after determining who "<Contact Name>" refers to.

In some embodiments, an individual's contact list may include two or more contacts that substantially match the name spoken. For example, if the contact name uttered is "Bob," and an individual's contact list includes a "Bob," a "Bobby," and a "Bob Smith," then when the contact list is searched for the name "Bob," each of the aforementioned contacts will be returned. The speech-processing system may determine which of the contacts is the intended contact by implementing various disambiguation rules to narrow down the options to as few as possible. In some embodiments, a request for the individual to confirm the contact, or contacts, may be made. For example, a confirmation message may be made asking "Call 'Bob', right?" or "Who do you want to call: 'Bob' or 'Bobby'?"

In an illustrative embodiment, an individual may request to call a contact—"Bob"—by speaking an utterance prefaced by a wakeword to their electronic device. For example, an individual may say, "Alexa, call 'Bob'." In response to detecting the wakeword (e.g., "Alexa"), the electronic device may package and send audio data representing the utterance to a speech-processing system. The speech-processing system may, upon receipt of the audio data, generate text data representing the audio data using automatic speech recognition processing, and may then provide the text data to natural language understanding processing to determine an intent of the utterance.

Natural language processing may determine, using the text data, that the utterance corresponds to a call intent, in one embodiment, which may indicate that a call function is to be invoked to communicate with a particular contact. The call intent may include one or more fillable slots or fields, which may represent an entity associated with the contact to be communicated with. For instance, the call intent may include a "Contact Name" slot, which may be filled-in by natural language processing upon the entity being resolved. In order to resolve the entity, natural language processing may contract a communications system's entity resolution functionality.

To resolve the contact, a value associated with the contact name slot, which in the illustrative embodiment may correspond to the text "bob," may be used to query a contact list associated with the individual. The contact list may be determined using a device identifier associated with the electronic device. For example, a media access control ("MAC") address may be identified within the audio data, or may be received substantially with the audio data, that indicates the particular device that the audio data was received from. The device identifier may be used to determine a account identifier, which indicates a particular account on the speech-processing system with which the electronic device is registered to. For example, during an initial device setup, the electronic device may be registered to an account on the speech-processing system. Using the account identifier, a contact list may be identified, which may be queried with the text value identified from the text. In one embodiment, the contact list may include contacts from each member of a group account associated with the electronic device. For example, the contact list may include contacts obtained from each family member, if the electronic device is associated with a particular household.

In one embodiment, a search of the contact list for the text value (e.g., the text "bob") may result in two or more contacts being identified. For instance, each contact entry in the contact list may be compared with the text value, and a confidence score may be generated indicating a likelihood that the text value and the contact entry are equal. If the confidence score is greater than a confidence score threshold, then this may indicate that the entry likely includes the text value. For example, contact entries such as "Bob," "Bobby," and "Bob, Jr." may each result in a confidence score that exceeds the confidence score threshold when compared against the text value "bob." In some embodiments, phonetically similar entries may also be returned. For example, when performing automatic speech recognition, a double metaphone process may be employed to identify other words that substantially sound like the text value. As an illustrative example, the word "bob" may sound similar to the word "rob." In this scenario, the contact list may also be queried for the word "rob," and any contact entries having a confidence score exceeding the confidence score threshold may also be returned.

For each contact entry of the contact list that is returned, a contact identifier may be obtained. The contact identifier may correspond to a unique value specific to a particular contact entry of the contact list. For example, when a contact is added to a contact list, that contact entry may be given a unique contact identifier that indicates an indexing value within the contact list for that contact. For example, if a first contact is added to a contact list, then that contact entry may be assigned a first contact identifier. In one embodiment, no two contact entries may have a same contact identifier. If more than one contact identifier is obtained, indicating that there are more than one contact entry of the contact list substantially matching the text value, then contact disambiguation processing between the one or more contact entries may be performed.

Contact disambiguation may correspond to one or more rules for filtering and reducing a number of possible contacts that an individual may have been referring to within the utterance. For example, if ten contact identifiers are obtained, this may indicate that there are ten contact entries within the contact list that substantially match the text value determined (e.g., ten contact entries matching the text "bob"). After performing the disambiguation processing, the number of contact entry options that may remain should be reduced to either a single contact's entry, or a few contact entries that may be provided to the requesting individual to be selected from.

In some embodiments, contact identifiers corresponding to confidence scores that are less than a predefined confidence score threshold, indicating a high confidence that the particular text value matches the contact entry, may be removed from consideration such that the content entry should be ignored. For instance, an "ignored" contact entry may correspond to a contact entry whose contact identifier may not be resolved to as an intended recipient of a communications request (e.g., call, message, etc.). Ignored contact entries may, for instance, correspond to contact entries that are removed by the system for consideration as being the entity with which the communications request is to be directed to. When an "ignored" contact entry is identified as being a possible entity that the communications may be directed, that contact entry (and/or that contact entry's corresponding contact identifier) may be flagged/indicated as being different than an intended recipient, and thus removed from consideration. As another example, a contact entry to be ignored may correspond to a contact that has been indicated as being part of a "do not call" list, a "block call" list, and/or a "unable to communicate" list. Of the remaining contact identifiers, a determination may be made as to whether or not any of the contact identifiers are included on a skip list. The skip list may correspond to one or more contacts that have previously been considered by disambiguation processing as being the contact entry, but the individual has not selected those contacts. For example, if an individual was prompted to confirm whether a particular contact is correct (e.g., "Call 'Bobby', right?"), but the individual did not select that contact (e.g., "No. Call 'Bob'."), then the corresponding contact identifier may be added to the skip list.

After removing contacts from the skip list, a communications account system may be accessed to obtain contact information associated with the remaining contact identifiers. The communications account system may store, for information associated with one or more group and/or user accounts registered thereto. For example, a group account on the communications system may include two or more user accounts, and contact information for each communications contact of the group account and two user accounts may be stored by the communications account system. The communications information may include, but is not limited to, communications identifiers for initiating/establishing communications sessions, telephone numbers, group account information, and the like. After receiving the communications information for each of the remaining contacts, disambiguation may be performed based on, for instance, whether or not a contact includes a communications identifier and/or is associated with a group account. Persons of ordinary skill in the art will recognize that additional disambiguation rules may be employed, and the aforementioned is purely illustrative.

In some embodiments, if two or more possible contacts remain, then additional information associated with those contacts may be used to assist in selecting one of the contacts. For instance, if an individual says, "Alexa, call 'Bob's home'," then a search may be performed to determine which contact is associated with the contact name "Bob's home." If there are two contact entries that both substantially match the contact name, then contact information for the contact identifiers associated with those contact entries may be obtained. Using the contact information, a follow-up message, or confirmation message, may be determined and provided to the requesting individual for selecting one of the contacts. As an illustrative example, if two contact entries are identified as corresponding to "Bob's home," and the contact information indicates that one of the contact entries has an additional contact associated therewith named "Mary," while the other contact entry has an additional contact associated therewith named "Jane," then the confirmation message may ask, "Do you mean the 'Bob's home' with 'Mary' or 'Jane'?" Based on which, if any, of the additional contacts selected, the corresponding contact entry may be determined.

Many households, offices, residences, and/or any other space, may include one or more shared devices. For example, a household may include one or more voice activated electronic devices. As described herein, a "shared device," a "communal device," and/or a "multi-user device" may correspond to various types of electronic device that are capable of being used by multiple individuals, and, in particular, may be interacted with by multiple individuals. Voice activated electronic devices, sound activated electronic device, and/or manually activated electronic devices may all correspond to exemplary types of shared devices. An individual located proximate to such a shared device, for example, may be capable of interacting with the shared device via voice, sound, and/or physical input, depending on the particular device's capabilities and configuration. Shared devices may be used by one or more individuals to facilitate a plethora of actions, such as, and without limitation, outputting content, obtaining information, interacting with additional devices/systems, and/or communicating with other individuals. As an illustrative example, an individual may use their voice activated electronic device to play music, order food, obtain weather information, and/or communicate with a friend or family member.

In some embodiments, a shared device, such as the shared devices described above, may correspond to sound controlled electronic device. One type of sound controlled electronic device may be a voice activated electronic device. In particular, a voice activated electronic device may correspond to one type of sound controlled electronic device that may be interacted with using spoken words. In some embodiments, a voice activated electronic device may be activated in response to a wakeword being uttered. In response to determining that the wakeword has been uttered, the voice activated electronic device may send audio data representing a spoken utterance subsequently following the wakeword to a speech-processing system for processing and analyzing the audio data. The speech-processing system may then generate and send a response to the voice activated electronic device, as well as, or alternatively, communicate with one or more additional systems for obtaining content to be rendered by the voice activated electronic device, and/or cause one or more additional electronic devices to output content and/or perform a particular action (e.g., turn on a light, preheat an oven, etc.). Additionally, the voice activated electronic device may store one or more wakewords within its local memory. If a determination is made that audio data received from audio input devices associated with the voice activated electronic device (e.g., microphones) matches the wakeword, then the voice activated electronic device may begin sending audio data representing some or all of the audio captured by the audio input devices to the speech-processing system.

Spoken voice commands, in some embodiments, may be prefaced by a wakeword, which may also be referred to as a trigger expression, wake expression, or activation word. In response to detecting the wakeword being uttered, a voice activated electronic device may be configured to detect and interpret any words that subsequently follow as actionable inputs or commands. In some embodiments, the voice activated electronic device may be activated by a phrase or grouping of words, which the voice activated device may also be configured to detect. The voice activated device, therefore, may also be able to detect and interpret any words subsequently following that phrase or grouping of words.

As used herein, the term "wakeword" may correspond to a "keyword" or "key phrase," an "activation word" or "activation words," or a "trigger," "trigger word," or "trigger expression." One exemplary wakeword may be a name, such as the name, "Alexa," however persons of ordinary skill in the art will recognize that the any word (e.g., "Amazon"), or series of words (e.g., "Wake Up" or "Hello, Alexa") may alternatively be used as the wakeword. Furthermore, the wakeword may be set or programmed by an individual operating a voice activated electronic device, and in some embodiments more than one wakeword (e.g., two or more different wakewords) may be available to activate a voice activated electronic device. In yet another embodiment, the trigger that is used to activate a voice activated device may be any series of temporally related sounds.

As used herein, the term "utterance" may correspond to a spoken word, statement, or sound. In some embodiments, an utterance may include the wakeword followed by an invocation, such as a request, question, or command. In this particular instance, the utterance may begin with the wakeword being spoken, and may end when a last word, phoneme, or sound is spoken. For example, an utterance may correspond to the question, "Alexa—What is the weather currently like?" As another example, an utterance may be, "Alexa—Play my workout music." Further still, an utterance, which need not include the wakeword, may be, "Turn up the volume" or "Call mom."

Another type of sound controlled electronic device may be a sound activated electronic device. Such sound activated electronic device may function similarly to voice activated electronic devices, except that, for sound activated electronic devices, the trigger may be a non-verbal sound. For example, the sound of a door opening, an alarm going off, glass breaking, a telephone ringing, or any other sound may alternatively be used to activate a sound controlled electronic device. In this particular scenario, detection of a non-verbal sound may occur in a substantially similar manner as that of a verbal wakeword for a voice activated electronic device. For example, the sound of a door opening, when detected, may activate a sound activated electronic device, which in turn may activate a burglar alarm.

In some embodiments, the sound controlled electronic device may also correspond to a manually activated electronic device. A manually activated electronic device, as described herein, may correspond to a device that is capable of being activated in response to a manual input from an individual (e.g., pressing a button, touching a portion of a touch screen, performing an action on a device). For example, a tap-to-talk device is one type of manually activated device. Such tap-to-talk devices, for instance, are capable of obtaining and outputting audio data in response to a button being pressed by an individual. In some embodiments, a sound controlled electronic device (e.g., a voice activated electronic device and/or a sound activated electronic device) may include manual activated functionality such that an individual may interact with the device using voice (e.g., speech prefaced by a wakeword), sound (e.g., a particular trigger sound), and/or a manual input (e.g., a button press, a touch of a screen, etc.). However, in some embodiments, an electronic device may be configured to include a single activation functionality (e.g., only voice activated, or only manually activated).

FIG. 1 is an illustrative diagram of an exemplary system for resolving a contact using a voice activated electronic device, in accordance with various embodiments. In a non-limiting example embodiment, an individual 2 may speak an utterance 4 to their voice activated electronic device 100. For example, individual 2 may speak utterance 4, "Alexa, Call 'Bob'." In response to detecting a wakeword, "Alexa," voice activated electronic device 100 may begin packing and sending audio data representing utterance 4 to a computing system 200. Upon determining a contact corresponding to the name "Bob," computing system 200 may be configured to facilitate a call, or other type of communication, with an electronic device determined to be associated with that contact. While a call is described as being an action to be performed, persons of ordinary skill in the art will recognize that any suitable type of communication, or any other type of function, may be performed including, but not limited to, VoIP communications, telephone communications, audio/video/text communications, and the like.

In some embodiments, computing system may determine a contact entry from the contact list as a possible contact to be used for the contact name slot, and may ask the user to confirm that the correct contact has been identified. For example, computing system 200 may provide a confirmation message 6—"Did you mean call 'Bobby'?"—to electronic device 100. If the contact mentioned by confirmation message 6 is incorrect, then individual 2 may respond by speaking utterance 8, "No. Call 'Bob'," indicating that the incorrect contact was named, as well as restating the contact name to be called. In this particular scenario, a contact identifier associated with the contact entry "Bobby," may be removed from consideration as the entity for the contact name slot. In other words, the contact entry for the contact name value "Bobby" may be ignored. This may correspond to the contact identifier for that contact entry being added to a skip list, which may indicate contact identifiers to be ignored/not considered when subsequently entity resolution processing is being performed.

During a subsequent turn attempting to determine the correct contact, two contact entries, "Bob" and "Bobby," may be determined. Based on the previous turn indicating that the contact entry "Bobby" was incorrect, the corresponding contact identifier may be removed from consideration such that the only contact entry remaining is "Bob." In this particular scenario, another confirmation message 10—"Call 'Bob'?"—may be provided to electronic device 100. If the contact entry is correct, then individual 2 may speak utterance 12—"Yes"—indicating that the correct contact entry was identified. The contact identifier may be used to obtain contact information, such as a telephone number or other communications identifier, such that a call may be initiated for that contact. A status message 14—"Ok. Calling 'Bob'."—may then be provided to electronic device 100 to indicate to individual 2 that the desired function is being performed.

Computing system 200, in one embodiment, may include various systems and modules. For instance, computing system 200 may include, amongst other features, a speech-processing system and a communications system. The speech-processing system may be capable of determining an intent of utterance 4 and causing one or more actions to be performed in response. The communications system may be capable of facilitating communications between electronic device 100 and one or more additional devices/systems.

In some embodiments, computing system 200 may perform exemplary process 150. Process 150 may begin at step 152. At step 152, audio data representing an utterance may be received at computing system 200. For example, in response to detecting a wakeword (e.g., "Alexa") or other trigger, voice activated electronic device 100 may send audio data representing utterance 4 (e.g., "Alexa, Call 'Bob'") to computing system 200. In one embodiment, the audio data may be received at a speech-processing system associated with computing system 200. The speech-processing system, which is described in greater detail below with reference to FIG. 2, may perform speech processing to the audio data.

At step 154, text data representing the audio data may be generated. For instance, upon receipt, computing system 200, and in particular a speech-processing system of computing system 200, may provide the audio data to an automatic speech recognition system including a speech-to-text system. The automatic speech recognition system may be configured to take input audio data and generate text data representing that audio data. In some embodiment, each contact entry from a contact list may be provided to the automatic speech recognition system to assist in generation of text data. After the text data is generated, it may be provided to a natural language understanding system that is capable of determining an intent of the utterance based on the text data. At step 156, the natural language understanding system of computing system 200 may determine that utterance 4 has a call intent. For example, using the text data received from the automatic speech recognition system, the natural language understanding system may determine that the likely intent of utterance 4 is for a call function (e.g., telephone call, VoIP call, video call, etc.) to be made. As an illustrative example, the natural language understanding system may resolve the intent of utterance 4 to be a "Call Intent."

At step 158, it may be determined that the call intent includes a contact name slot (e.g., {Contact Name}). Various intents may be associated with various slots or fields that may be filled-in, or fillable, based on characteristics of the utterance. In one particular embodiment, the call intent may be determined t include a contact name slot, which corresponds to an entity that the call function of the call intent is to be directed. In other words, the natural language understanding system may attempt to determine who is to be called by determining the contact that the utterance's text refers to. At step 160, an entity resolution system may be invoked to determine a value for the contact name slot. For example, the call intent may be associated with a particular functionality (e.g., a communications system functionality associated with a communications system), which may host its own entity resolution system to determine a likely value associated with a particular slot. For instance, using the text data, entity resolution may attempt to resolve an entity associated with the text value "bob." In the illustrative embodiment, the communications system functionality may access a communications system associated with computing system 200 to resolve a value for the contact name slot for the call intent.

At step 162, a contact list may be queried for the value associated with the contact name slot. For instance, the contact name slot may have the text value "bob" associated with it, but the natural language understanding system may not be able to identify who that contact is based on the word. A particular contact (e.g., a telephone number, communications identifier, etc.) may need to be obtained such that the call function may be executed to communicate with that contact. To do this, a contact list may be searched for the value "Bob" to obtain a contact entry for each contact stored within the contact list that may be associated with the value "Bob."

In some embodiments, a device identifier associated with electronic device 100 may be received at a substantially same time as the audio data. The device identifier, which may, for example, correspond to a MAC address of electronic device 100, may be used to determine a account identifier that electronic device 100 is registered to. In one embodiment, when electronic device 100 is setup, it may be registered to a particular account on computing system 200. That account, which may be referred to as a primary account, may be given a unique account identifier that is linked to the device identifier of electronic device 100. Each interaction between electronic device 100 and computing system 200 may involve communicating the device identifier to indicate the account identifier such that computing system 200 may know "who" it is communication with. In some embodiments, an account identifier for electronic device 100 may be associated with a communications identifier for a communications system of computing system 200 such that electronic device 100 may be used to communicate with other devices using a communications network facilitated by the communications system. The communications identifier may be associated with a group account, which may correspond to a communications account associated with a particular shared device, such as electronic device 100. Each group account may include one or more user accounts that are associated with the group account such that users of those user accounts are capable of accessing communications sent by, or received by, the group account. Furthermore, a contact list associated with the group account may be populated by contacts associated with each user account. Therefore, when the account identifier is determined based on the device identifier received, the contact list that is associated with that account identifier may be determined.

At step 164, two (or more) probable contact identifiers for the value associated with the contact name slot may be received from the contact database. For example, if the value is "Bob," and the contact list includes contact entries for "Bob" and "Bob John," then the contact identifiers associated with each of these contact names may be returned, as each may return a confidence score exceeding a confidence score threshold. The contact identifiers may, in one embodiment, correspond to a unique identifier associated with each contact listing from an individual's contact list. For example, when a contact is added to a contact list, that contact may be assigned a unique contact identifier. As an illustrative example, if ten contacts are uploaded to the contact database for an individual's communications account—<Contact 1>, <Contact 2>, <Contact 10>—then each contact may receive a contact identifier that is independent from the other contacts—<Contact ID #1>, <Contact ID #2>, . . . , <Contact ID #10>. Persons of ordinary skill in the art will recognize that although the illustrative example describes two probable contact identifiers being returned, any number of contact identifiers may be returned based on whether their corresponding contact entry's confidence score exceeds a confidence score threshold. For example, if there are contact entries "Bob," "Bobby," "Bob George," and "John Bob," then contact identifiers for each of these four contact entries may be returned. Furthermore, if only a single contact entry is determined to have a confidence score exceeding the confidence score threshold, then only that single contact entry's corresponding contact identifier may be returned.

At step 166, the contact identifiers associated with each of the contact names may be provided to a contact resolution system. In some embodiments, the contact resolution system may include disambiguation rules for assisting in disambiguating between multiple contact identifiers to resolve a correct contact. Furthermore, the contact resolution system may determine contact information for the contact(s) to be used for executing the call intent. In some embodiments, a contact services system may be queried for contact objects associated with the contact identifiers. The contact objects, in one embodiment, may include information associated with the provided contact identifiers such as, and without limitation, a communications identifier associated with a particular contact identifier, a phone number or numbers associated with a contact identifier, a phone number type of the phone number(s), and the like.

At step 168, a determination may be made as to whether or not any of the contact identifiers are part of a skip list. The skip list, in one embodiment, may correspond to contact identifiers that have been identified as being possible entities to be attributed to the contact name slot, but which have been de-selected. For example, if an individual is requested to selected between one or more contact entries to confirm them as the entity for the contact name slot, and the individual does not select that contact or contacts, then the/those contact(s) may be added to the skip list. The skip list, in other words, may indicate contacts from previous disambiguation attempts that have been determined to not be the correct contact. If, at step 168, it is determined that one or both (if only two) contact identifiers from step 166 are part of the skip list, then process 150 may proceed to step 170. At step 170, the contact identifier(s) that are determined to be part of the skip list may be removed from consideration as a possible entity that the contact name slot can be resolved to. For instance, the contact identifier(s) may be ignored by the contact resolution process such that the corresponding contacts are not resolved as being the contact intended on being communicated with. An "ignored" contact may be a contact that is otherwise removed from consideration as being the entity that the contact name slot is to be resolved to. However, if at step 168, it is determined that none of the contact identifiers are part of the skip list, then process 150 may proceed to step 176.

At step 172, a determination may be made as to whether there are any contact identifiers remaining after removing the contact identifiers that are part of the skip list. If there are no contact identifiers remaining, then process 150 may proceed to step 174, where an error prompt may be rendered. For example, the error prompt may correspond to computing system 200 providing an error message to electronic device 100 indicating that the contact to be communicated with was unable to be determined (e.g., "I can't figure out who you want to call"). However, if at step 172 it is determined that there is a contact identifier remaining, then process 150 may proceed to step 176.

At step 176, second text data representing a confirmation message may be determined. The confirmation message may ask whether the correct contact has been determined. If step 176 is arrived at after determining that, at step 168, none of the contact identifiers are part of the skip list, then the confirmation message may ask for the user to select between the contact entries for those remaining contact identifiers. For example, if contact identifiers for the contact entries "Bob" and "Bob John" are remaining, then the confirmation message may be: "Did you mean 'Bob' or 'Bob John'?" However, if step 176 is arrived at after determining that there is only a single contact identifier remaining at step 172, then the confirmation message may ask for the user to select between the contact entry associated with the remaining contact identifier. For example, if the contact identifier that remains corresponds to the contact entry "Bob," then the confirmation message may be: "Call 'Bob', right?" At step 178, second audio data representing the second text data may be generated. For instance, using text-to-speech processing, second audio data may be generated. At step 180, computing system 200 may send the second audio data to electronic device 100 to be output thereby.

At step 182, a response to the confirmation message may be received. For instance, audio data representing sounds captured by electronic device 100 after the confirmation message is provided may be received by computing system 200. In some embodiments, text data representing this audio data may be generated. At step 184, a determination may be made as to whether or not the contact identifier(s) for the contact entry/entries that remained at step 176 was/were confirmed. For example, confirmation 6 message may be "Did you mean 'Bobby'?" If, the response received corresponds to response 8, for instance, "No. Call 'Bob'," then that may indicate that the contact identifier associated with the contact entry "Bobby" was incorrect. In this particular scenario, process 150 may proceed to step 186, where the contact identifier for that contact entry that was determined to be incorrect may be added to the skip list. If, for instance, the confirmation message asked for a selection of two or more contact entries (e.g., "Did you mean 'Bobby' or 'Bobby Jr.'?"), and neither of those were selected by individual 2, then the contact identifiers associated with the contact entries may be added to the skip list. After step 186, process 150 may repeat until a maximum number of iterations have occurred, at which point an error prompt may be rendered. However, if one of the contact entries, or the contact entry, was confirmed at step 184, then process 150 may proceed to step 188 where computing system 200 may cause the call to be initiated. For instance, if the individual says "Yes," such as in utterance 12, then this may indicate that the correct contact entry was identified, and therefore a call function may be initiated with a communications identifier associated with that contact entry's contact identifier. For instance, a communications identifier for the selected contact may be received at a speechlet associated with the call intent. The speechlet may correspond to a service/function of a communications system that is configured to execute an action. In this particular scenario, the "call" or "communications" speechlet may be configured to execute a call function to a particular contact object (e.g., telephone number). The speechlet may cause a communications system routing component to place a call to the communications identifier. For example, the contact "Bob" may be identified, and may be associated with a telephone number or communications identifier. That information may be received by the speechlet, which may execute the call/communication to that number/identifier.

Figure 2:
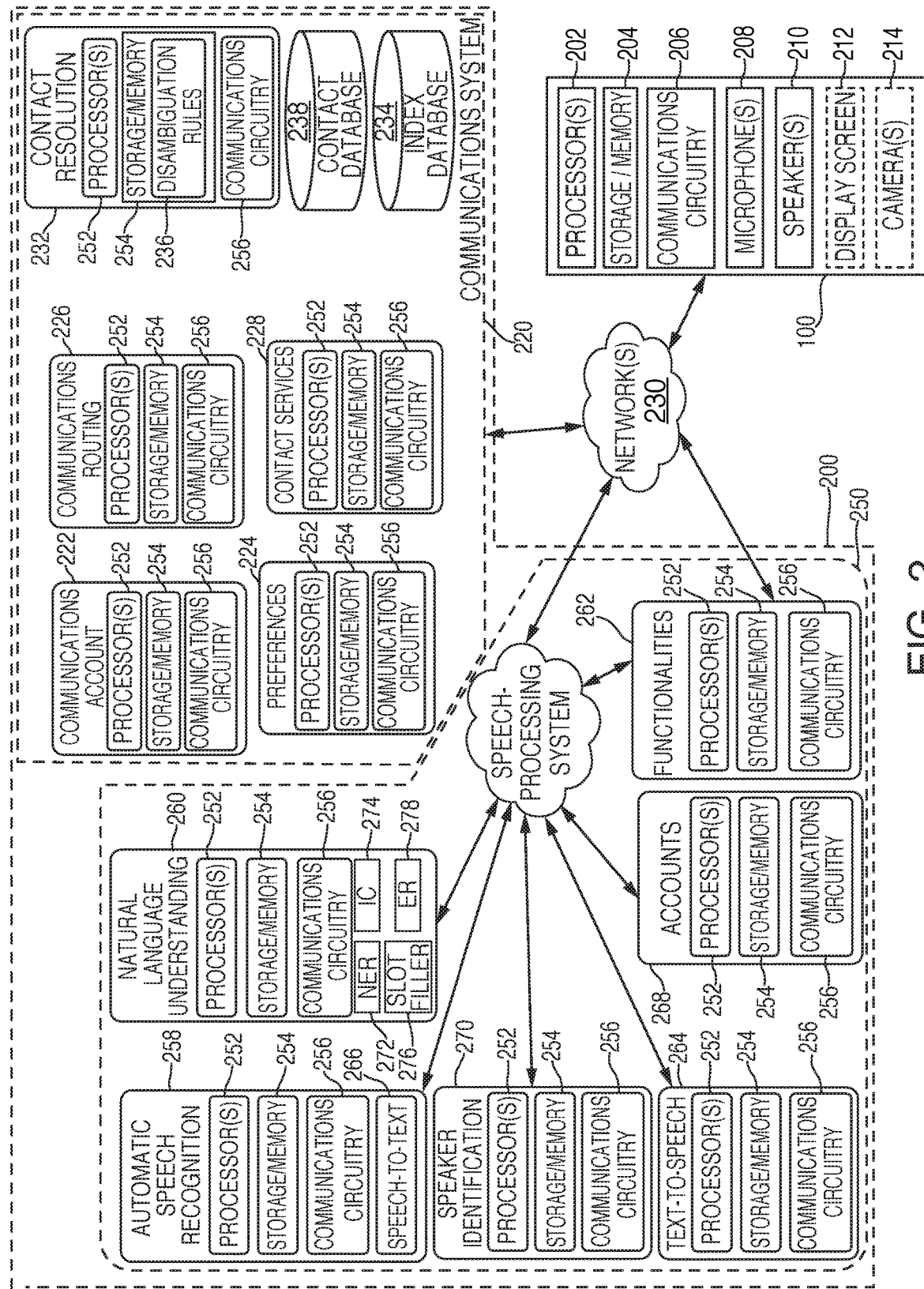
FIG. 2 is an illustrative diagram of the exemplary system architecture of FIG. 1, in accordance with various embodiments.

FIG. 2 is an illustrative diagram of the exemplary system architecture of FIG. 1, in accordance with various embodiments. Shared voice activated electronic device 100 may, in some embodiments, include sound controlled functionality, such as one or more voice or sound activated components. In some embodiments, electronic device 100 may be configured to communicate with computing system 200, and in particular a speech-processing system 250, in response to detecting an utterance including a wakeword, which may subsequently be followed by a request/question/statement. Similarly, electronic device 100 may alternatively or additionally include one or more manually activated components for manually activation functionality. In this particular scenario, electronic device 100 may also be configured, in one embodiment, to communicate with computing system 200, and thus speech-processing system 250, in response to a manual input being detected by one or more input mechanisms, such as a touch screen, a button, and/or a switch, for example.

In a non-limiting embodiment, electronic device 100 may be capable of being activated in response to detecting a specific sound, such as a wakeword, as well as, or alternatively, via one or more inputs. After detecting a specific sound (e.g., a wakeword or trigger expression), electronic device 100 may recognize commands (e.g., audible commands, inputs) within captured audio, and may perform one or more actions in response to the received commands. Furthermore, electronic device 100 may also be configured to perform one or more actions in response to detecting a particular touch, or mechanical, input(s) via electronic device 100.

Electronic device 100 may correspond to any suitable type of electronic device including, but are not limited to, desktop computers, mobile computers (e.g., laptops, ultrabooks), mobile phones, smart phones, tablets, televisions, set top boxes, smart televisions, personal display devices, large scale display devices (e.g., billboards, street signs, etc.), personal digital assistants ("PDAs"), gaming consoles and/or devices, smart furniture, smart household devices (e.g., refrigerators, microwaves, etc.), smart vehicles (e.g., cars, trucks, motorcycles, etc.), smart transportation devices (e.g., ships, trains, airplanes, etc.), wearable devices (e.g., watches, pins/broaches, headphones, etc.), and/or smart accessories (e.g., light bulbs, light switches, electrical switches, etc.). In some embodiments, electronic device 100 may be relatively simple or basic in structure such that no, or a minimal number of, mechanical input option(s) (e.g., keyboard, mouse, track pad) or touch input(s) (e.g., touch screen, buttons) are included. For example, electronic device 100 may be able to receive and output audio, and may include power, processing capabilities, storage/memory capabilities, and communication capabilities. However, in other embodiments, electronic device 100 may include one or more components for receiving mechanical inputs or touch inputs, such as a touch screen and/or one or more buttons.

Electronic device 100, in one embodiment, may include a minimal number of input mechanisms (e.g., a power on/off switch) such that functionality of electronic device 100 may solely or primarily be through audio input and audio output. For example, electronic device 100 may include, or be in communication with, one or more microphones that listen for a wakeword by continually monitoring local audio. In response to the wakeword being detected, electronic device 100 may establish a connection with computing system 200, send audio data to computing system 200, and await/receive a response from computing system 200. In some embodiments, however, non-voice/sound activated devices may also communicate with computing system 200 (e.g., push-to-talk devices). For example, in response to a button or touch screen being pressed, or a button or touch screen being pressed and held, a microphone associated with electronic device 100 may begin recording local audio, establish a connection with computing system 200, send audio data representing the captured audio to computing system 200, and await/receive a response, and/or action to be occur, from computing system 200.

Persons of ordinary skill in the art will recognize that although in the illustrative embodiment computing system 200 includes a speech-processing system 250, a communications system 220, and a presence tracking system 240, this is merely exemplary, and speech-processing system 250, communications system 220, and/or presence tracking system 240 may be separate from computing system 200. For example, speech-processing system 250 may be located within a dedicated computing device or computing system, which may or may not be in communication with computing system 200 and/or one or more additional devices.

Electronic device 100 may include one or more processors 202, storage/memory 204, communications circuitry 206, one or more microphones 208 or other audio input devices (e.g., transducers), one or more speakers 210 or other audio output devices, a display screen 212, and one or more cameras 214 or other image capturing components. However, one or more additional components may be included within electronic device 100, and/or one or more components may be omitted. For example, electronic device 100 may also include a power supply or a bus connector. As still yet another example, electronic device 100 may include one or more additional input and/or output mechanisms, such as one or more buttons, or one or more switches or knobs. Furthermore, while electronic device 100 may include multiple instances of one or more components, for simplicity only one of each component has been shown.

In some embodiments, electronic device 100 may correspond to a manually activated device, or may include the functionality of a manually activated device. A manually activated device, as described herein, may correspond to a device that is capable of being activated in response to a manual input (e.g., pressing a button, touching a portion of a touch screen, performing an action on a device). For example, a tap-to-talk device is one type of manually activated device. Such tap-to-talk devices, for instance, are capable of obtaining and outputting audio data in response to a button being pressed.

In one embodiment, electronic device 100 may be in communication with an additional processing device including one or more of: processor(s) 202, storage/memory 204, communications circuitry 206, microphone(s) 208, speaker(s) 210, display screen 212, and/or camera(s) 214. For example, a centralized control device of electronic device 100 may include one or more microphone(s) 208. These microphone(s) 208 may receive audio input signals, which in turn may be sent to computing system 200 and/or speech-processing system 250 in response to a wakeword engine of electronic device 100 determining that a wakeword was uttered.

Processor(s) 202 may include any suitable processing circuitry capable of controlling operations and functionality of electronic device 100, as well as facilitating communications between various components within electronic device 100. In some embodiments, processor(s) 202 may include a central processing unit ("CPU"), a graphic processing unit ("GPU"), one or more microprocessors, a digital signal processor, or any other type of processor, or any combination thereof. In some embodiments, the functionality of processor(s) 202 may be performed by one or more hardware logic components including, but not limited to, field-programmable gate arrays ("FPGA"), application specific integrated circuits ("ASICs"), application-specific standard products ("ASSPs"), system-on-chip systems ("SOCs"), and/or complex programmable logic devices ("CPLDs"). Furthermore, each of processor(s) 202 may include its own local memory, which may store program systems, program data, and/or one or more operating systems. However, processor(s) 202 may run an operating system ("OS") for electronic device 100, and/or one or more firmware applications, media applications, and/or applications resident thereon. In some embodiments, processor(s) 202 may run a local client script for reading and rendering content received from one or more websites. For example, processor(s) 202 may run a local JavaScript client for rendering HTML or XHTML content received from a particular URL accessed by electronic device 100.

Storage/memory 204 may include one or more types of storage mediums such as any volatile or non-volatile memory, or any removable or non-removable memory implemented in any suitable manner to store data for electronic device 100. For example, information may be stored using computer-readable instructions, data structures, and/or program systems. Various types of storage/memory may include, but are not limited to, hard drives, solid state drives, flash memory, permanent memory (e.g., ROM), electronically erasable programmable read-only memory ("EEPROM"), CD-ROM, digital versatile disk ("DVD") or other optical storage medium, magnetic cassettes, magnetic tape, magnetic disk storage or other magnetic storage devices, RAID storage systems, or any other storage type, or any combination thereof. Furthermore, storage/memory 204 may be implemented as computer-readable storage media ("CRSM"), which may be any available physical media accessible by processor(s) 202 to execute one or more instructions stored within storage/memory 204. In some embodiments, one or more applications (e.g., gaming, music, video, calendars, lists, etc.) may be run by processor(s) 202, and may be stored in memory 204.

In some embodiments, storage/memory 204 may include a media system, which may be configured to facilitate communications between electronic devices 100 and computing system 200. For example, the media system may store one or more communications protocols that may be executed by processor(s) 202 for facilitating communications for device 100. In some embodiments, a sessions initiation protocol ("SIP") may be used to facilitate media transfer between electronic device 100 and one or more of computing system 200 and another electronic device 100. SIP, for example, is an application layer protocol that is text based, and may employ Real-time Transport Protocol ("RTP") or Secure Real-time Transport Protocol ("SRTP") functions. In particular, PJSIP communications functionality may be employed to support audio, video, presence, and messaging communications for electronic device 100. In some embodiments, a Web Real-Time Communications ("WebRTC") protocols may be employed by electronic device 100. In a non-limiting embodiment, the media system may include instructions that indicate which communications protocols to employ for facilitating media transfer between devices based on a device type of electronic device 100. For example, if electronic device 100 does not include display 212 and/or camera 214, then the media system may indicate that PJSIP should be used, whereas if electronic device 100 includes display 212 and/or camera 214 then the media system may indicate that WebRTC protocols should be used.

In some embodiments, storage/memory 204 may include one or more systems and/or databases, such as a speech recognition system, a wakeword database, a sound profile database, and a wakeword detection system. The speech recognition system may, for example, include an automatic speech recognition ("ASR") component that recognizes human speech in detected audio. The speech recognition system may also include a natural language understanding ("NLU") component that determines user intent based on the detected audio. Also included within the speech recognition system may be a text-to-speech ("TTS") component capable of converting text to speech to be outputted by speaker(s) 210, and/or a speech-to-text ("STT") component capable of converting received audio signals into text to be sent to computing system 200 and/or speech-processing system 250 for processing.

The wakeword database may be a database stored locally by storage/memory 204 of electronic device 100, and may include a list of a current wakeword for electronic device 100, as well as one or more previously used, or alternative, wakewords for voice activated electronic device. In some embodiments, an individual may set or program a wakeword for their electronic device 100. The wakeword may be programmed directly on electronic device 100, or a wakeword or wakewords may be set by the individual via a local client application that is in communication with computing system 200 and/or speech-processing system 250. For example, an individual may use their mobile device having the speech-processing system application running thereon to set the wakeword. The specific wakeword may then be communicated from the mobile device to speech-processing system 250, which in turn may send/notify electronic device 100 of the individual's selection for the wakeword. The selected activation may then be stored in the wakeword database of storage/memory 204. In some embodiments, additional trigger expressions or permutations of the wakeword may also be stored within storage/memory 204. For example, specific trigger expressions or words that indicate the presence of the wakeword may also be stored within storage/memory 204. In some embodiments, audio watermarks, indicating a specific action or message, may also be stored within storage/memory 204.

In some embodiments, sound profiles for different words, phrases, commands, or audio compositions are also capable of being stored within storage/memory 204, such as within a sound profile database. For example, a sound profile of audio may be stored within the sound profile database of storage/memory 204 on electronic device 100. In this way, if a particular sound (e.g., a wakeword or phrase) is detected, a corresponding command or request may be ignored, for example. A sound profile, for example, may correspond to a frequency and temporal decomposition of a particular audio file or audio portion of any media file, such as an audio fingerprint or spectral representation.

The wakeword detection system may include an expression detector that analyzes an audio signal produced by microphone(s) 208 to detect a wakeword, which generally may be a predefined word, phrase, or any other sound, or any series of temporally related sounds. Such an expression detector may be implemented using keyword spotting technology, as an example. A keyword spotter is a functional component or algorithm that evaluates an audio signal to detect the presence of a predefined word or expression within the audio signal detected by microphone(s) 208. Rather than producing a transcription of words of the speech, a keyword spotter generates a true/false output (e.g., a logical I/O) to indicate whether or not the predefined word or expression was represented in the audio signal. In some embodiments, an expression detector may be configured to analyze the audio signal to produce a score indicating a likelihood that the wakeword is represented within the audio signal detected by microphone(s) 208. The expression detector may then compare that score to a wakeword threshold to determine whether the wakeword will be declared as having been spoken.

In some embodiments, a keyword spotter may use simplified ASR techniques. For example, an expression detector may use a Hidden Markov Model ("HMM") recognizer that performs acoustic modeling of the audio signal and compares the HMM model of the audio signal to one or more reference HMM models that have been created by training for specific trigger expressions. An MINI model represents a word as a series of states. Generally, a portion of an audio signal is analyzed by comparing its MINI model to an HMM model of the trigger expression, yielding a feature score that represents the similarity of the audio signal model to the trigger expression model.

In practice, an HMM recognizer may produce multiple feature scores, corresponding to different features of the HMM models. An expression detector may use a support vector machine ("SVM") classifier that receives the one or more feature scores produced by the HMM recognizer. The SVM classifier produces a confidence score indicating the likelihood that an audio signal contains the trigger expression. The confidence score is compared to a confidence threshold to make a final decision regarding whether a particular portion of the audio signal represents an utterance of the trigger expression (e.g., wakeword). Upon declaring that the audio signal represents an utterance of the trigger expression, electronic device 100 may then begin transmitting the audio signal to speech-processing system 250 for detecting and responds to subsequent utterances made by an individual.

In some embodiments, storage/memory 204 may store voice biometric data associated with one or more individuals. For example, an individual that operates electronic device 100 may have a registered user account on computing system 200 (e.g., within accounts system 268). In some embodiments, electronic device 100 may be associated with a group account, and various individuals may have user accounts that are operating under the rules and configurations of the group account. As an illustrative example, voice activated shared electronic device 100 may be associated with a first group account on computing system 200, the first group account being for a family that lives at a household where first shared electronic device is located. Each family member may also have a user account that is linked to the first group account (e.g., a parent, a child, etc.), and therefore each user account may obtain some or all of the rights of the first group account. For example, electronic device 100 may have a first group account on computing system 200 registered to a particular family or group, and each of the parents and children of the family may have their own user account registered under the parent's registered account. In one illustrative embodiment, voice biometric data for each individual may be stored by that individual's corresponding user account. The voice biometric data, for instance, may correspond to a "voice print" or "voice model" of a particular individual, which may be a graphical representation of a person's voice including a frequency decomposition of that individual's voice, acoustic features associated with training data for a particular individual, and/or vectors representing the acoustic features. A more detailed description of speaker identification processing is described below.

Communications circuitry 206 may include any circuitry allowing or enabling one or more components of electronic device 100 to communicate with one another, one or more additional devices, servers, and/or systems. For example, communications circuitry 206 may facilitate communications between electronic device 100 and computing system 200. As an illustrative example, audio data representing an utterance (e.g., utterance 4 of FIG. 1) may be transmitted over a network 230, such as the Internet, to computing system 200 using any number of communications protocols. For example, network(s) 230 may be accessed using Transfer Control Protocol and Internet Protocol ("TCP/IP") (e.g., any of the protocols used in each of the TCP/IP layers), Hypertext Transfer Protocol ("HTTP"), WebRTC, SIP, and wireless application protocol ("WAP"), are some of the various types of protocols that may be used to facilitate communications between electronic device 100 and computing system 200. In some embodiments, electronic device 100 and computing system 200 and/or one or more additional devices or systems (e.g., speech-processing system 250) may communicate with one another via a web browser using HTTP. Various additional communication protocols may be used to facilitate communications between electronic device 100 and computing system 200, including, but not limited to, Wi-Fi (e.g., 802.11 protocol), Bluetooth, radio frequency systems (e.g., 900 MHz, 1.4 GHz, and 5.6 GHz communication systems), cellular networks (e.g., GSM, AMPS, GPRS, CDMA, EV-DO, EDGE, 3GSM, DECT, IS-136/TDMA, iDen, LTE or any other suitable cellular network protocol), infrared, BitTorrent, FTP, RTP, RTSP, SSH, and/or VOIP.

Communications circuitry 206 may use any communications protocol, such as any of the previously mentioned exemplary communications protocols. In some embodiments, electronic device 100 may include an antenna to facilitate wireless communications with a network using various wireless technologies (e.g., Wi-Fi, Bluetooth, radiofrequency, etc.). In yet another embodiment, electronic device 100 may include one or more universal serial bus ("USB") ports, one or more Ethernet or broadband ports, and/or any other type of hardwire access port so that communications circuitry 206 allows electronic device 100 to communicate with one or more communications networks.

Electronic device 100 may also include one or more microphones 208 and/or transducers. Furthermore, one or more microphones located within a separate device may be in communication with electronic device 100 to capture sounds for electronic device 100. Microphone(s) 208 may be any suitable component capable of detecting audio signals. For example, microphone(s) 208 may include one or more sensors for generating electrical signals and circuitry capable of processing the generated electrical signals. In some embodiments, microphone(s) 208 may include multiple microphones capable of detecting various frequency levels. As an illustrative example, electronic device 100 may include multiple microphones (e.g., four, seven, ten, etc.) placed at various positions about electronic device 100 to monitor/capture any audio outputted in the environment where electronic device 100 is located. The various microphones 208 may include some microphones optimized for distant sounds, while some microphones may be optimized for sounds occurring within a close range of electronic device 100. In some embodiments, microphone(s) 208 may only begin to detect audio signals in response to a manual input to electronic device 100. For example, a manually activated device may begin to capture audio data using microphone(s) 208 in response to a user input, such as pressing a button, tapping a touch screen, or providing any touch input gesture to a touch input component.

Electronic device 100 may include one or more speakers 210. Furthermore, electronic device 100 may be in communication with one or more speaker(s) 210. Speaker(s) 210 may correspond to any suitable mechanism for outputting audio signals. For example, speaker(s) 210 may include one or more speaker units, speaker housings, transducers, arrays of speakers, and/or arrays of transducers that may be capable of broadcasting audio signals and or audio content to a surrounding area where electronic device 100 may be located. In some embodiments, speaker(s) 210 may include headphones or ear buds, which may be wirelessly wired, or hard-wired, to electronic device 100, that may be capable of broadcasting audio directly to an individual.

In some embodiments, one or more microphones 208 may serve as input devices to receive audio inputs. Electronic device 100, in the previously mentioned embodiment, may then also include one or more speakers 210 to output audible responses. In this manner, electronic device 100 may function solely through speech or audio, without the use or need for any input mechanisms or displays, however this is merely exemplary.

Display screen 212 may correspond to a display device and/or touch screen, which may be any size and/or shape and may be located at any portion of electronic device 100. Various types of displays may include, but are not limited to, liquid crystal displays ("LCD"), monochrome displays, color graphics adapter ("CGA") displays, enhanced graphics adapter ("EGA") displays, variable graphics array ("VGA") display, or any other type of display, or any combination thereof. Still further, a touch screen may, in some embodiments, correspond to a display device including capacitive sensing panels capable of recognizing touch inputs thereon. For instance, display screen 212 may correspond to a projected capacitive touch ("PCT"), screen include one or more row traces and/or driving line traces, as well as one or more column traces and/or sensing lines. In some embodiments, display screen 212 may be an optional component for electronic device 100. For instance, electronic device 100 may not include display screen 212. Such devices, sometimes referred to as "headless" devices, may output audio, or may be in communication with a display device for outputting viewable content.

Display screen 212, in one non-limiting embodiment, may include an insulator portion, such as glass, coated with a transparent conductor, such as indium tin oxide ("InSnO" or "ITO"). In general, one side of the touch screen display may be coated with a conductive material. A voltage may be applied to the conductive material portion generating a uniform electric field. When a conductive object, such as a human finger, stylus, or any other conductive medium, contacts the non-conductive side, typically an outer surface of display screen 212, a capacitance between the object and the conductive material may be formed. Processor(s) 202 may be capable of determining a location of the touch screen associated with where the capacitance change is detected, and may register a touch input as occurring at that location.

In some embodiments, display screen 212 may include multiple layers, such as a top coating layer, a driving line layer, a sensing layer, and a glass substrate layer. As mentioned previously, the glass substrate layer may correspond to an insulator portion, while the top coating layer may be coated with one or more conductive materials. The driving line layer may include a number of driving lines, and the sensing layer may include a number of sensing lines, which are described in greater detail below. Persons of ordinary skill in the art will recognize that one or more additional layers, or spaces between layers, may be included. Furthermore, persons of ordinary skill in the art will recognize that any number of driving lines and sensing lines for driving the line layer and the sensing layer, respectively, may be used.

In some embodiments, the driving lines and the sensing lines of the driving line layer and the sensing line layer, respectively, may form a number of intersection points, where each intersection functions as its own capacitor. Each sensing line may be coupled to a source, such that a charge is provided to each sensing line, and changes in capacitance of a particular driving line and sensing line are detectable thereby. In response to a conductive object being brought proximate, or substantially touching an outer surface of the top coating layer, a mutual capacitance of a particular capacitor (e.g., an intersection point) may reduce in magnitude. In other words, a voltage drop may be detected at a location on display screen 212 corresponding to where a conductive object contacted display screen 212.

A change in capacitance may be measured to determine a location on the touch screen where the object has contacted the surface. For example, if an individual touches a point on display screen 212, then a corresponding driving line and sensing line that intersect at that point may be identified. A location of the point may have one or more pixels associated with that location, and therefore one or more actions may be registered for an item or items that are displayed at that location. Processor(s) 202 of electronic device 100 may be configured to determine which pixels are associated with a particular location point, and which item or items are also displayed at that pixel location. Furthermore, electronic device 100 may be configured to cause one or more additional actions to occur to the item or items being displayed on display screen 212 based on a temporal duration the touch input, and or if one or more additional touch inputs are detected. For example, an object that contacted display screen 212 at a first location may be determined, at a later point in time, to contact display screen 212 at a second location. In the illustrative example, an object may have initially contacted display screen 212 at the first location and moved along a particular driving line to the second location.

In this scenario, a same driving line may have detected a change in capacitance between the two locations, corresponding to two separate sensing lines.

The number of driving lines and sensing lines, and therefore the number of intersection points, may directly correlate to a "resolution" of a touch screen. For instance, the greater the number of intersection points (e.g., a greater number of driving lines and sensing lines), the greater precision of the touch input. For instance, a touch screen display screen 212 having 100 driving lines and 100 sensing lines may have 100 intersection points, and therefore 100 individual capacitors, while a touch screen display screen 212 having 10 driving lines and 10 sensing lines may only have 10 intersection points, and therefore 10 individual capacitors. Therefore, a resolution of the touch screen having 100 intersection points may be greater than a resolution of the touch screen having 10 intersection points. In other words, the touch screen having 100 intersection points may be able to resolve a location of an object touching the touch screen with greater precision than the touch screen having 10 intersection points. However, because the driving lines and sensing lines require a voltage to be applied to them, this may also mean that there is a larger amount of power drawn by electronic device 100, and therefore the fewer driving lines and/or sensing lines used, the smaller the amount of power that is needed to operate the touch screen display.

In some embodiments, display screen 212 may correspond to a high-definition ("HD") display. For example, display screen 212 may display images and/or videos of 720p, 1080p, 1080i, or any other image resolution. In these particular scenarios, display screen 212 may include a pixel array configured to display images of one or more resolutions. For instance, a 720p display may present a 1024 by 768, 1280 by 720, or 1366 by 768 image having 786,432; 921,600; or 1,049,088 pixels, respectively. Furthermore, a 1080p or 1080i display may present a 1920 pixel by 1080 pixel image having 2,073,600 pixels. However, persons of ordinary skill in the art will recognize that the aforementioned display ratios and pixel numbers are merely exemplary, and any suitable display resolution or pixel number may be employed for display screen 212, such as non-HD displays, 4K displays, and/or ultra displays.

In some embodiments, electronic device 100 may include one or more cameras 214, corresponding to any suitable image capturing component or components capable of capturing one or more images and/or videos. Camera(s) 214 may, in some embodiments, be configured to capture photographs, sequences of photographs, rapid shots (e.g., multiple photographs captured sequentially during a relatively small temporal duration), videos, or any other type of image, or any combination thereof. In some embodiments, electronic device 100 may include multiple cameras 214, such as one or more front-facing cameras and/or one or more rear facing cameras. Furthermore, camera(s) 214 may be configured to recognize far-field imagery (e.g., objects located at a large distance away from electronic device 100) or near-filed imagery (e.g., objected located at a relatively small distance from electronic device 100). In some embodiments, the camera(s) may be high-definition ("HD") cameras, capable of obtaining images and/or videos at a substantially large resolution (e.g., 726p, 1080p, 1080i, etc.). In some embodiments, camera(s) 214 may be optional for electronic device 100. For instance, camera(s) 214 may be external to, and in communication with, electronic device 100. For example, an external camera may be capable of capturing images and/or video, which may then be provided to electronic device 100 for viewing and/or processing.

Persons of ordinary skill in the art will recognize that, in some embodiments, display screen 212 and/or camera(s) 214 may be optional for electronic device 100. For instance, electronic device 100 may function using audio inputs and outputting audio, and therefore display screen 212 and/or camera(s) 214 may not be included. Furthermore, in some embodiments, electronic device 100 may not include display screen 212 and/or camera(s) 214, but instead may be in communication with display screen 212 and/or camera(s) 214. For example, electronic device 100 may be connected to a display screen via a Wi-Fi (e.g., 802.11 protocol) connection such that visual content sent to electronic device 100 may be sent to the display screen, and output thereby.

In one exemplary embodiment, electronic device 100 may include an additional input/output ("I/O") interface. For example, electronic device 100 may include one or more input components capable of receiving user inputs. Various types of input components may include, but are not limited to, keyboards, buttons, switches, a mouse, joysticks, or an external controller may be used as an input mechanism for the I/O interface. In some embodiments, the output portion of the I/O interface of electronic device 100 may include one or more lights, light emitting diodes ("LEDs"), or other visual indicator(s). Persons of ordinary skill in the art will recognize that, in some embodiments, one or more features of the output portion of the I/O interface may be included in a purely voice activated version of electronic device 100. For example, one or more LED lights may be included on electronic device 100 such that, when microphone(s) 208 receive audio, the one or more LED lights become illuminated signifying that audio has been received by electronic device 100. In some embodiments, one or more vibrating mechanisms or other haptic features may be included with electronic device 100 to provide a haptic response to an individual.

In some embodiments, electronic device 100 may include radio-frequency identification ("RFID") functionality and/or near field communication ("NFC") functionality. Furthermore, in some embodiments, electronic device 100 may include one or more infrared ("IR") sensors and one or more IR emitters. The IR sensors/emitters may be used to determine depth information. For example, in one embodiment, a distance of an individual from electronic device 100 may be determined using the one or more IR sensors/emitters. Depth determination may be performed using any depth determination technique. In some embodiments, a distance between an individual and electronic device 100 may be employed as a basis for presenting content with varying density using display screen 212. For example, when an individual is at a distance A from electronic device 100, electronic device 100 may display weather data for a current day. However as the user moves closer to electronic device 100, such as at a distance B from electronic device 100, which may be less than distance A, electronic device 100 may display weather data for a current week. For instance, as the individual gets closer to electronic device 100, the ability of the individual to see denser content increases, and as the individual moves father away from electronic device 100, the individual's ability to see denser content decreases. This, for example, may ensure that the content displayed by electronic device 100 is continually relevant and readable by the individual. Still further, electronic device 100 may include a device beaconing component that is capable of measuring a signal strength of a particular device to determine how close that device is to electronic device 100. For example, electronic device 100 may include a received signal strength indicator ("RSSI") component that measures an RSSI value received from another electronic device, such as a smartphone or tablet. Based on the RSSI value, electronic device 100 may be able to determine how close a particular device is, and thus, how likely an individual associated with that device is to electronic device 100.

Speech-processing system 250, in one embodiment, may include various components and systems including, but not limited to, automatic speech recognition ("ASR") system 258, natural language understanding ("NLU") system 260, functionalities system 262, text-to-speech ("TTS") system 264, accounts system 268, and speaker identification system 270. In some embodiments, speech-processing system 250 may also include computer readable media, including, but not limited to, flash memory, random access memory ("RAM"), and/or read-only memory ("ROM"). Speech-processing system 250 may also include various systems that store software, hardware, logic, instructions, and/or commands for speech-processing system 250, or any other system, or any combination thereof.

ASR system 258 may be configured to recognize human speech in detected audio, such as audio captured by microphone(s) 208, which may then be transmitted to speech-processing system 250. ASR system 258 may include, in one embodiment, one or more processor(s) 252, storage/memory 254, and communications circuitry 256. Processor(s) 252, storage/memory 254, and communications circuitry 256 may, in some embodiments, be substantially similar to processor(s) 202, storage/memory 204, and communications circuitry 206, which are described in greater detail above, and the aforementioned descriptions may apply. In some embodiments, ASR system 258 may include speech-to-text ("STT") system 266. STT system 266 may employ various speech-to-text techniques. However, techniques for transcribing speech into text are well known in the art and need not be described in further detail herein, and any suitable computer implemented speech to text technique may be used to convert the received audio signal(s) into text, such as SOFTSOUND speech processing technologies available from the Autonomy Corporation, which is headquartered in Cambridge, England, United Kingdom.

ASR system 258 may include an expression detector that analyzes audio signals received by speech-processing system 250, such as the expression detector mentioned above with regards to electronic device 100. Such an expression detector may be implemented using keyword spotting technology, as an example. A keyword spotter is a functional component or algorithm that evaluates an audio signal to detect the presence of a predefined word or expression, such as a passphrase or other sound data, within the audio signals. Rather than producing a transcription of words of the speech, a keyword spotter generates a true/false output (e.g., a logical I/O) to indicate whether or not the predefined word or expression was represented in the audio signal. In some embodiments, an expression detector may be configured to analyze the audio signal to produce a score indicating a likelihood that a particular word or phrase (e.g., a wakeword), is represented within the audio signal. The expression detector may then compare that score to a threshold value to determine whether that word or phrase will be declared as having been spoken.

For instance, ASR system 258 may transcribe received audio data into text data representing the words of the speech contained in the audio data using STT system 266. The text data may then be used by other components for various purposes, such as executing system commands, inputting data, etc. ASR system 258 may then interpret an utterance based on the similarity between the utterance and pre-established language models stored in an ASR model knowledge base of storage/memory 254. For example, the input audio data may be compared with models for sounds (e.g., sub-word units or phonemes) and sequences of sounds to identify words that match the sequence of sounds spoken in the utterance of the audio data.

The different ways a spoken utterance may be interpreted (i.e., the different hypotheses) may each be assigned a probability or a confidence score representing a likelihood that a particular set of words matches those spoken in the utterance. The confidence score may be based on a number of factors including, for example, the similarity of the sound in the utterance to models for language sounds (e.g., an acoustic model), and the likelihood that a particular word which matches the sounds would be included in the sentence at the specific location (e.g., using a language or grammar model). Thus each potential textual interpretation of the spoken utterance (hypothesis) is associated with a confidence score. Based on the considered factors and the assigned confidence score, ASR system 258 may output the most likely text recognized in the audio data. ASR system 258 may also output multiple hypotheses in the form of a lattice or an N-best list with each hypothesis corresponding to a confidence score or other score (such as probability scores, etc.).

ASR system 258 may further attempt to match received feature vectors to language phonemes and words as known in acoustic models and language models stored within storage/memory 254 of ASR system 258. Recognition scores may be determined for the feature vectors based on acoustic information and language information. The acoustic information may be used to calculate an acoustic score representing a likelihood that the intended sound represented by a group of feature vectors matches a language phoneme. The language information may be used to adjust the acoustic score by considering what sounds and/or words are used in context with each other, thereby improving the likelihood that the speech recognition process will output speech results that make sense grammatically. The specific models used may be general models or may be models corresponding to a particular domain, such as music, application enablement/disablement, shopping, etc.

ASR system 258 may generate results in the form of a single textual representation of the speech, an N-best list including multiple hypotheses and respective scores, and/or lattice, for example, which may be sent to NLU system 260 for processing, such as conversion of the text into commands for execution, either by electronic device 100, speech-processing system 250, communications system 220, or by another device, such as a separate device or server capable of performing one or more additional functionalities thereon (e.g., a television capable of outputting video content).

NLU system 260 may be configured such that it determines an intent of an utterance based on the received audio data. NLU system 260 may determine one or more domains, which may also be referred to as categories, that may be capable of handling the intent of the utterance. For example, utterance 4, "Call <Contact Name>," may be identified by a communications domain. As another example, the utterance "Play this," may be identified by a Music domain, an E-Book domain, and a Video domain as possibly being able to handle the corresponding request. For instance, NLU system 260 may identify that the word "Play" may be a recognized intent of each of the aforementioned domains (as well, possibly, other domains). In some embodiments, to determining an utterance's intent, NLU system 260 may communicate with functionalities system 262 to cause one or more specific functionalities to be accessible, perform one or more tasks, and/or retrieve an appropriate response or response information. NLU system 260 may include processor(s) 252, storage/memory 254, and communications circuitry 256 which, in one embodiment, may be substantially similar to processor(s) 202, storage/memory 204, and communications circuitry 206 of electronic device 200, and the previous description may apply.

NLU system 260 may include a named entity recognition ("NER") system 272, which may be used to identify portions of text that correspond to a named entity recognizable by NLU system 260. A downstream process called named entity resolution may be configured to link a portion of text to an actual specific known entity. To perform named entity resolution, the system may utilize gazetteer information stored in an entity library storage. The gazetteer information may be used for entity resolution, for example matching ASR results with different entities (such as song titles, contact names, etc.). Gazetteers may be linked to a user account or profile of users accounts system 268, certain domains (e.g., music or shopping), communications account system 222 of communications system 220, and/or may be organized in a variety of other ways.

Generally, NLU system 260 takes textual input and attempts to make a semantic interpretation of the text. That is, NLU system 260 may be configured to determine a meaning of text based on the individual words and then implements that meaning. In some embodiments, NLU system 260 may interpret a text string to derive an intent or a desired action of the utterance (e.g., utterance 4) as well as the pertinent pieces of information in the text that allow an action to be completed. For example, if a spoken utterance is processed by ASR system 258 and outputs the text, "call mom," NLU system 260 may determine that an intent of the utterance is to activate a telephone, or telephone functionality, and to initiate a call with a contact matching the entity "mom." In some embodiments, NLU system 260 may process several textual inputs related to the same utterance. For example, if ASR system 258 outputs N text segments (as part of an N-best list), then NLU system 260 may process all N outputs.

As will be discussed further below, NLU system 260 may be configured to parse and tag annotate text. For example, for the text "call mom," "call" may be tagged as a command (e.g., a command to execute a phone call), and "mom" may be tagged as a specific entity and target of the command (e.g., a telephone number for the entity corresponding to "mom" stored in a contact list). Further, NLU system 260 may be used to provide answer data in response to queries, for example, using a knowledge base stored within storage/memory 254 of NLU system 260 and/or storage/memory of speech-processing system 250.

To correctly perform natural language understanding processing of speech input, NLU system 260 may be configured to determine a domain of an utterance. By determining the domain, NLU system 260 may narrow down which services and functionalities offered by an endpoint device (e.g., electronic device 100, speech-processing system 250, communications system 220, or any other electronic device or system) may be relevant. For example, an endpoint device may offer services relating to interactions with a telephone service (e.g., communications routing system 226), a contact list service (e.g., contact services system 228), a calendar/scheduling service, a music player service, etc. As another example, an endpoint device may enable certain services or functionalities for an individual having a user account of speech-processing system 250. Words in a single text query may implicate more than one service, and some services may be functionally linked (e.g., both a telephone service and a calendar service may utilize data from the contact list).

NER system 272 may be configured to receive a query in the form of one or more results from ASR system 258. NER system 272 may then attempt to identify relevant grammars and lexical information that may be used to construe meaning of the one or more results. To do so, NER system 272 may begin by identifying potential domains that may relate to the received query. NLU system 260 may include a databases of devices within storage/memory 254 of NLU system 260 that may be used to identify domains associated with specific devices. For example, electronic device 100 may be associated with domains for music, telephone functionality, calendar information, contact lists, and/or device-specific communications. In addition, NLU system 260 may store an entity library including database entries for specific services available on a specific device or devices, either indexed by that device's identification number, a customer identification number, a household identification number, and/or using any other suitable indicator.

In one non-limiting embodiment, a domain may represent a discrete set of activities, services, and/or functionalities that have a common theme, such as "communications," "shopping," "music," or "videos." As such, each domain may be associated with a particular language model and/or grammar database, a particular set of intents/actions, and a particular personalized lexicon. In some embodiments, each user account may have its own language model including words, phrases, sentence structures, response templates, and the like, configured for the user account. Each gazetteer may include domain-indexed lexical information associated with a particular account of accounts system 268 and/or electronic device 100. For example, a first gazetteer may include first domain-index lexical information. A user's music-domain lexical information might include album titles, artist names, and song names, for example, whereas a user's contact-list lexical information might include the names of contacts. Since every user's music collection and contact list is presumably different, this personalized information improves entity resolution.

In some embodiments, NLU system 260 may be configured to apply the rules, models, and information applicable to each identified domain. For example, if a query potentially implicates both the communications domain and the music domain, the query may, substantially in parallel, cause the natural language understanding processing may use the grammar models and lexical information for the communications domain as well as use the grammar models and lexical information for the music domain. The responses based on the query produced by each set of models is scored, with the overall highest ranked result from all applied domains being ordinarily selected to be the correct result.

An intent classification ("IC") system 274 may parse the query to determine an intent or intents for each identified domain, where the intent corresponds to the action to be performed that is responsive to the query. Each domain is associated with a database of words linked to intents. For example, a music intent database of a music domain may link words and phrases such as "play" to a play music intent, "stop" to a stop playing music intent, and "mute" to a mute volume intent. As another example, a communications intent database of the communications domain may link words and phrases such as "call" to a call contact intent, "message" to a message contact intent, and the like. IC system 276 may be configured to identify potential intents for each domain by comparing words in the query to the words and phrases in that domain's intents database. Traditionally, the determination of an intent by IC system 274 is performed using a set of rules or templates that are processed against the incoming text to identify a matching intent.

In order to generate a particular interpreted response, NER system 272 applies the grammar models and lexical information associated with the respective domain to actually recognize one or more entities in the text of the query. Each grammar model includes the names of entities (i.e., nouns) commonly found in speech about the particular domain (i.e., generic terms), whereas the lexical information from the gazetteer is personalized to the user(s) and/or the device. For instance, a grammar model associated with the shopping domain may include a database of words commonly used when people discuss shopping.

The intents identified by IC system 274 may be linked to domain-specific grammar frameworks having "slots" or "fields" to be filled. Each slot or field may correspond to a portion of the query text that the system believes corresponds to an entity. For example, if "play music" is an identified intent, a grammar framework or frameworks may correspond to sentence structures such as "Play {Artist Name}," "Play {Album Name}," "Play {Song name}," "Play {Song name} by {Artist Name}," etc. However, to make resolution more flexible, these frameworks would ordinarily not be structured as sentences, but rather based on associating slots with grammatical tags. As another example, if "Play 'Song 1'" is an identified intent, a grammar framework may correspond to sentence structures such as "Play {Song Title}." As yet another example, if "Call 'Bob'" is an identified intent of a communications domain, a grammar framework may correspond to a sentence structure such as "Call {Contact Name}," where the slot {Contact Name} has a value "Contact Name" associated with it.

NER system 272 may parse the query to identify words as subject, object, verb, preposition, etc., based on grammar rules and/or models, prior to resolving named entities. The identified verb may be used by IC module 274 to identify intent, which is then used by NER system 272 to identify frameworks. A framework for an intent of "play" may specify a list of slots/fields/placeholders applicable to place the identified "object" such as, for example, {Artist Name}, {Album Name}, {Song Name}, {Application Name}, {Anaphoric Term}, and any object modifier (e.g., a prepositional phrase). A framework for an intent of "call" may specify a list of slots/fields/placeholders applicable to place the identified "object" such as, for example, {Contact Name}, {Group Account Name}, {User Account Name}, {Communications Identifier}, and the like. NER system 272 may then search the corresponding fields in the domain-specific and personalized lexicon(s), attempting to match words and phrases in the query, which are tagged as a grammatical object or object modifier, with those identified in the database(s).

This process may include semantic tagging, which is the labeling of a word or a combination of words according to their type/semantic meaning. Parsing may be performed using heuristic grammar rules, or an NER model may be constructed using techniques such as hidden Markov models, maximum entropy models, log linear models, conditional random fields ("CRF"), and the like.

For instance, a query of "Play 'Song 1' by 'Artist 1'" might be parsed and tagged as {Verb}: "Play," {Object}: "Song 1," {Object Preposition}: "by," and {Object Modifier}: "Artist 1." At this point in the process, "Play" may be identified as a verb based on a word database associated with the music domain, which IC system 276 may determine corresponds to the "play music" intent. No determination has been made as to the meaning of "Song 1" and "Artist 1," but based on grammar rules and models, it may be determined that the text of these phrases relate to the grammatical object (i.e., entity) of the query. As another illustrative example, a query of "Call 'Contact 1'" may be parsed and tagged as {Verb}: "Call," {Object}: "Contact 1." "Call" may be identified as a verb based on a word database associated with a communications domain, which IC system 276 may determine corresponds to a "call" intent.

The frameworks linked to the intent may then be used to determine what database fields should be searched to determine the meaning of these phrases, such as searching a user's gazette for similarity with the framework slots. So a framework for a "play music" intent might attempt to resolve the identified object for {Artist Name}, {Album Name}, {Song Name}, and {Application Name}, {Anaphoric Term} and another framework for the same intent might attempt to resolve the object modifier based on {Artist Name}, and resolve the object based on {Album Name} and {Song Name} linked to the identified {Artist Name}. Similarly, the framework for a "call" intent may attempt to resolve the identified object for {Contact Name} or {Communications Identifier}. If the search of the gazetteer does not resolve a slot/field using gazetteer information, NER system 272 may search the database of generic words associated with the particular domain. So, for instance, if the query was "play songs by 'Artist 1,'" after failing to determine an album name or song name called "songs" by "Artist 1," NER system 272 may search the domain vocabulary for the word "songs." For example, use of the object "songs" may correspond to some or all of the songs associated with a particular artist (e.g., "Artist 1"). In the alternative, generic words may be checked before the gazetteer information, or both may be tried, potentially producing two different results.

The results of the natural language understanding processing may be tagged to attribute meaning to the query. So, for instance, "Play 'Song 1' by 'Artist 1'" might produce a result of: {Domain}: "Music," {Intent}: "Play Music," {Artist Name}: "Artist 1," {Media Type}: "Song," and {Song Name}: "Song 1." As another example, "Play songs by 'Artist 1'" might produce: {Domain}: "Music," {Intent}: "Play Music," {Artist Name}: "Artist 1," and {Media Type}: Song. Still further, "Add this to my cart" might produce a result of: {Domain} Shopping, {Intent}: "Add item to," {Anaphoric Term}: "this," and {List Type} "cart." Yet further still, "Call 'Contact 1'" might produce a result of: {Domain}: Communications, {Intent}: "Call," and {Contact Name}: "Contact 1."

The output from NLU system 260 (which may include tagged text, commands, etc.) may then be sent to an orchestrator and/or a command processor, which may be located on, or may be in communication with, speech-processing system 250. The destination command processor may be determined based on the output of NLU system 260. For example, if NLU system 260 outputs include a command to play music, the destination command processor may be a music playing application, such as one located on electronic device 100 or in a music playing application, configured to execute a music playing command to cause a particular audio file to output. If the output of NLU system 260, however, includes a search request, the destination command processor may include a search engine processor, such as one located on a search server, configured to execute a search command. If the output of NLU system 260 includes a request for enablement of an application's functionalities for a particular user account, then the language model for the user account may be updated to include one or more invocations, utterance frameworks, response frameworks, and values for the frameworks, for a particular application. If the output of NLU system 260 includes a request to call a contact, then the destination command processor may include a communications routing processor to initiate a communication with a particular contact's communications identifier.

In some embodiments, NLU system 260 may also include an entity resolution system 278, which allows NLU system 260 to query each domain of NLU system 260 to determine which domain or domains believe that they can handle a given request. Upon performing the query, each domain may return a "score" indicating a likelihood that they can handle the application in question. For instance, various domains may return scores of LOW, MEDIUM, or HIGH, indicating the likelihood that they can handle the particular application. Entity resolution system 278 may return application/system names or titles for the request, which may be based on relevance scores that estimate a confidence that a particular application/system may be best used for the request. As an illustrative example, if the utterance is, "Call 'Contact 1'," NLU system 260 may determine, using entity resolution system 278, which domain(s), and thus application(s)/functionality or functionalities, can likely handle this request, and may select the domain and/or application/functionality having the highest confidence score as being the domain and/or application/functionality able to handle the request. NLU system 260 may further include a slot filler system 276 that can apply rules or other instructions to standardize labels or tokens from previous stages into an intent/slot representation. The precise transformation may depend on the domain. For example, a communications domain may include a text mention of "<Contact Name> home," and may be transform the text mentioned to resolved contact's name (e.g., "Contact 1").

Functionalities system 262 may, for example, correspond to various action specific systems or servers, sometimes referred to as "skills," capable of processing various task specific actions. Functionalities system 262 may further correspond to first party applications and/or third party applications capable of performing various tasks or actions. For example, based on the context of the audio received from electronic device 100, speech-processing system 200 may use a certain functionality to generate a response, or to obtain response information, which in turn may be communicated back to electronic device 100. For instance, an utterance may ask for weather information, and therefore functionalities system 262 may access a weather application to obtain current weather information for a location associated with electronic device 100. In some embodiments, a communications functionality may be included by functionalities system 262 that, when invoked, causes speech-processing system 250 and communications system 220 to communicate with one another. Functionalities system 262 may also include processor(s) 252, storage/memory 254, and communications circuitry 256. In some embodiments, functionalities system 262 may be capable of communicating with communications system 220 using network(s) 230. For example, functionalities system 262 may be configured, in response to NLU system 260 determining that an intent of an utterance is associated with communications functionality, to access communications system 220 to facilitate the action(s) associated with the intent.

In some embodiments, an application of functionalities system 262 may be written in various computer languages, such as JavaScript and Java. Various applications may include an intent schema file and a sample utterances file, such as, for example, IntentSchema.json including the JSON defining the intents of a particular application, and a SampleUtterances.txt including plain text sample utterances for the particular application. Applications may also include application specific code, such as a JavaScript or Java file, common library code, and various other JavaScript or Java modules.

TTS system 264 may employ various text-to-speech techniques. However, techniques for transcribing speech into text are well known in the art and need not be described in further detail herein, any suitable computer implemented speech to text technique may be used to convert the received audio signal(s) into text, such as SOFTSOUND speech processing technologies available from the Autonomy Corporation, which is headquartered in Cambridge, England, United Kingdom. TTS system 264 may also include processor(s) 252, storage/memory 254, and communications circuitry 256.

Accounts system 268 may store one or more user accounts corresponding to users having a registered account on speech-processing system 250. For example, a parent may have a registered account on computing system 200, and each of the parent's children may have their own user account registered under the parent's registered account. In some embodiments, each user account on accounts system 268 may be associated with a particular account identifier, which may be associated with a device identifier. When a request is received by computing system 200, a device identifier indicating the device that the request was received from. The device identifier may then be mapped to an account identifier, which may indicate an account that the requesting device is registered to. In some embodiments, accounts system 268 may store voice biometric data representing voice biometric information for a specific user account. For example, acoustic features of a particular individual's voice may be stored for that individual's user account by accounts system 268. This may allow speaker identification techniques (e.g., speaker identification system 270) to be used to determine whether a generated vector corresponds to voice biometric data associated with a specific user account and/or a group account. In some embodiments, accounts system 268 may store a device identifier associated with a particular device, a communications identifier associated with a particular user account and/or group account, or any other suitable information, or any combination thereof. Accounts system 266 may also include processor(s) 252, storage/memory 254, and communications circuitry 256

Speaker identification system 270, in some embodiments, may correspond to any suitable device/system capable of identifying a particular person's voice from an audio signal. Speaker identification system 270 may determine whether a current voice being used to speak matches known voice biometric data associated with a particular individual's voice. In some embodiments, voice biometric data may be stored within accounts system 268 for various individuals having a user account stored thereby. For example, individual 2 may have a user account on computing system 200 (e.g., stored within accounts system 268), which may be associated with electronic device 100. Stored within the user account may be voice biometric data, such as stored vectors representing stored acoustic features associated with a voice of individual 2. Therefore, when an utterance, such as utterance 4, is detected by electronic device 100, and subsequently when audio data representing that utterance is received by computing system 200, speaker identification system 270 may determine whether the voice used to speak utterance 4 matches, to at least a predefined confidence threshold, the stored voice biometric information associated with individual 2 stored by their user account. If so, then this may indicate that individual 2 is the likely speaker of utterance 4.

In some embodiments, speaker identification system 270 may receive audio data representing an utterance, or a copy of the audio data, at a substantially same time as ASR system 258. The audio data may be divided into audio frames representing time intervals, with which a number of values or features representing qualities of the audio data may be determined, along with a set of those values (e.g., feature vectors or audio feature vectors) representing features/qualities of the audio data for each audio frame. For example, each audio frame may include 25 ms of audio, and the frames may start at 10 ms intervals. This may result in a sliding window where adjacent audio frames include 15 ms of overlapping audio. Persons of ordinary skill in the art will recognize that many different acoustic features may be determined, and each feature may be representative of a particular quality of the audio data. Some exemplary approaches that may be used to process the received audio data may include, but art not limited to, mel-frequency cepstral coefficients ("MFCCs"), perceptual linear predictive ("PLP") techniques, neural network feature vector techniques, linear discriminant analysis, and semi-tied covariance matrices. Speaker identification system 276 may also include a scoring component that determines respective confidence scores indicating how likely it is that an input utterance was spoken by a particular user.

When audio data is received by computing system 200, ASR system 258, speaker identification system 270, and/or any other suitable component of speech-processing system 250, may perform windowing functions to the audio data to generate framed audio data. The size of each audio frame may depend on a particular configuration of speech-processing system 250, and persons of ordinary skill in the art will recognize that any audio frame size may be used. For example, as mentioned previously, each audio frame may include 25 milliseconds of audio data, and may overlap with 10 milliseconds of a next audio frame, resulting in a sliding window. Performing a windowing function may include multiplying a time record by a finite-length window with an amplitude that varies smoothly and gradually toward zero at its edges. By performing windowing, endpoints of the waveforms of respective audio frames of audio data meet, resulting in a continuous waveform without sharp transitions. A fast Fourier transform ("FFT") may be performed to convert the waveforms in each audio frame of the framed audio data from its original domain (e.g., time) to a representation in a frequency domain (thereby creating frequency domain framed audio data). Audio processing techniques other than or in addition to FFT may be used to transform audio data (e.g., waveforms) into data that can be processed as needed.

In some embodiments, user recognition feature extraction may be performed on the frequency domain framed audio data. User recognition feature extraction may include performing frame level feature extraction and/or utterance level feature extraction. The frame level feature extraction may determine which frame of a universal background model ("UBM") the frame corresponds to. The UBM may be a Gaussian mixture model, a deep neural network, etc. The utterance level feature extraction may analyze aligned speech frames to derive feature vectors of fixed length (i.e., the user recognition feature/vector data). The feature extraction may continue until voice activity is no longer detected in the input audio data, at which point an endpoint of the speech may be identified and speech processing may end. Feature extraction may, in some embodiments, be performed on all the audio data received from the electronic device 100. Alternatively, feature extraction may only be performed on audio data including speech. Feature extraction and user recognition feature extraction may include determining values (i.e., features) representing qualities of the frequency domain framed audio data, along with quantitating those features into values (i.e., acoustic feature vectors or audio feature vectors). Feature extraction may determine automatic speech recognition feature/vector data, which may assist with speech recognition processing for ASR system 258, and user recognition feature extraction may determine user recognition feature/vector data, which may assist with speaker identification/user recognition for speaker identification system 276. The feature/vector data and the user recognition feature/vector data may include the same features/vectors, different features/vectors, or may include some overlapping features/vectors. A number of approaches may be used to extract features/vectors from the frequency domain framed audio data, such as MFCCs, PLP techniques, neural network feature vector techniques, linear discriminant analysis, semi-tied covariance matrices, and persons of ordinary skill in the art will recognize that any other suitable approach may be employed.

Speaker identification system 270 may perform speaker identification using various data including user recognition features/vector data, and training data that may correspond to sample audio data corresponding to known users associated with a particular device (e.g., electronic device 100). Speaker identification system 270 may generate confidence scores indicating a likelihood that a particular utterance was spoken by one of the users associated with a particular device, and may determine whether any of these confidence scores is greater than a predefined confidence score threshold. If so, then that may indicate a likelihood that a certain user is the speaker of the utterance. If two or more confidence scores are determined to be in excess of the confidence score threshold, then speaker identification system 270 may select the user having the greater confidence score, or may prompt the device to obtain additional information to resolve the speaker's identity.

In some embodiment, training data may be obtained and stored by user accounts system 268. The training data may be stored as waveforms and/or corresponding features/vectors, and may correspond to data from various audio samples, each audio sample associated with a known user and/or user identity. For example, each user known to the system may be associated with some set of training data for the known user. Speaker identification system 270 may then use the training data to compare against incoming audio data (represented by user recognition feature/vector data) to determine an identity of a user speaking an utterance. The training data may be associated with multiple users of multiple devices and therefore may be associated with both a user that spoke the respective utterance, as well as electronic device 100, which provided the audio data representing the spoken utterance.

The training data for a particular user may include a feature vector of the same size as a vector of the user recognition feature/vector data. Thus, for example, if a feature vector is of size F, the training data may also be a feature vector of size F. To create such a training data feature vector, during a training period computing system 200 may either prompt a user to speak sample audio data or may identify sample audio data known to have been spoken by a particular user. The system may then process the sample audio data to create sample training data (e.g., a feature vector of size F). The training data may then be stored by user accounts system 268 and saved for use during runtime user verification processing.

In some embodiments, speaker identification processing may further include various additional techniques to determine a speaker of an utterance. For example, device beaconing may indicate a likelihood that a particular individual's device is located proximate to electronic device 100. In this particular scenario, if an individual's device is determined to be substantially close to electronic device 100 at a time when the wakeword is uttered, then this may indicate that the wakeword was likely spoken by that individual. As another example, historical rules may be employed to determine a speaker of an utterance. For example, one particular individual may typically interact with electronic device 100, and therefore it may be more likely that when a wakeword is detected by electronic device 100, that wakeword is more likely than not spoken by that particular individual. Still further, certain individuals may be interact with electronic device 100 during certain times, or to perform certain functions. For example, a particular individual may typically ask for a weather forecast using electronic device 100 during a particular time frame (e.g., between 8 and 9 o'clock). In this particular scenario, if the wakeword is determined to have been uttered during that time frame, then this may indicate that there is a high likelihood that a speaker of the wakeword (and the corresponding utterance) is that individual. As another example, if a particular individual has just performed a specific function, such as sending a message to another individual, then if the wakeword is detected by electronic device 100 temporally after, and within a certain amount of time of, the specific function, then this may indicate that that individual likely spoke the corresponding utterance. Persons of ordinary skill in the art will recognize that various additional techniques may be employed to determine a speaker of an utterance, and the aforementioned are merely exemplary. Speaker identification system 270 may also include processor(s) 252, storage/memory 254, and communications circuitry 256.

Persons of ordinary skill in the art will recognize that although each of ASR system 258, NLU system 260, subject matter/skills system 262, TTS system 264, accounts system 268, and speaker identification system 270 may each include instances of processor(s) 252, storage/memory 254, and communications circuitry 256, and those instances of processor(s) 252, storage/memory 254, and communications circuitry 256 within each of ASR system 258, NLU system 260, functionalities system 262, TTS system 264, accounts system 268, and speaker identification system may differ. For example, the structure, functionality, and style of processor(s) 252 within ASR system 258 may be substantially similar to the structure, functionality, and style of processor(s) 252 within NLU system 260, however the actual processor(s) 252 need not be the same entity.

Computing system 200 may also include, in a non-limiting embodiment, communications system 220, which may be capable of facilitating a communications session between electronic device 100 and one or more additional devices, and/or providing communications to electronic device 100. For instance, communications system 220 may facilitate communications over a communications network. Communications system 220, in one embodiment, may include a communications routing system 226. Communications routing system 226 may employ VoIP functionality to facilitate audio, video, and/or text data communications between the initiating device and the recipient device. In some embodiments, communications routing system 226 may allow a communications session to be established between an initiating device and a recipient device using one or more VoIP protocols including, but not limited to SIP, RTP, RTCP, SRTP, and SDP. In one illustrative embodiment, a SIP signaling command may be provided to communications routing system 226 for communicating with the recipient device. In particular, PJSIP functionality adds a new "user-to-user" header that indicates the device pair for the communications session. As an illustrative example, communications routing system 226 may route communications to a device's communications identifier in response to receiving an instruction to establish a communications session between one communications identifier and another.

In one embodiment, communications routing system 226 may include any suitable rules and/or prioritization schemes for organizing and group messages received for one or more user accounts and/or group accounts. For example, rules that cause messages having similar sender information to be grouped together may be included within communications routing system 226. In some embodiments, communications routing system 226 may include one or more rules to prioritize messages for playback. Such rules may include, but are not limited to, playback rules based on speaker identification, sender information, urgency of a message, vocal inflection, temporal aspects of the message, and/or content of the message. Communications routing system 226 may also include a message database, in one embodiment, capable of storing messages, or any other type of communication (e.g., telephone calls, text messages, emails, etc.). The message database may store each message that has been received with a corresponding user account or group account with which that message is directed to. Communications routing system 226 may also include processor(s) 252, storage/memory 254, and communications circuitry 256.

In one embodiment, communications system 220 may include communications accounts system 222, which may store one or more group accounts corresponding to one or more shared devices. Communications account system 222 may include a communications account database that stores communications identifiers for each group account and/or user account that is/are capable of communicating using communications system 220. For instance, a group account associated with one communications identifier may communicate with another group account associated with another communications identifier across a communications network facilitated by communications system 220.

In one embodiment, each communications account may be stored as being associated with account identifiers, linking accounts for speech-processing system 250 and communications system 220. For example, a shared device, such as shared voice activated electronic device 100, may have its own group account stored on communications accounts system 222. The group account may be associated with the shared device, and may also be linked to one or more individual's user accounts. For example, shared electronic device 100 may be associated with a first group account corresponding to a first grouping of individual (e.g., a family). One or more user accounts may also be associated with the first group account (e.g., individual members of the family), corresponding to individuals that may be capable of interacting with shared electronic device 100. Information, settings, and/or preferences, for example, for each user account may be stored within a user account database. In some embodiments, communications accounts system 222 and accounts system 268 may communicate with one another via a network 230 to provide one another with account information associated with certain devices and communications accounts. For example, accounts system 268 may store voice biometric data for a particular user account, which may then be provided to communications accounts system 222 to determine a communications identifier and/or other communications information associated with that user account so as to allow a device associated with the user account to communicate with one or more additional devices. Communications account system 222 may also include processor(s) 252, storage/memory 254, and communications circuitry 256.

Communications system 220 may, in some embodiments, include a contact services system 228. Contact services system 228 may store contact lists, contact information, and the like, associated with one or more communications identifiers. For example, if electronic device 100 is registered to an account identifier associated with electronic device 100, and in particular to individual 2 who is a registered user of electronic device 100, then a contact list associated with individual 2 may be accessible from contact services system 228 based on a communications identifier associated with the account identifier. In some embodiments, two or more communications identifiers may be linked together such that their contact lists may both be used to populate another contact list, such as a group account's contact list. For example, if two user accounts, corresponding to two separate users, are both associated with a same group account, then contact lists for each of the two user accounts may form the group account's contact list, which may then be associated with the account identifier. Communications system 220 may, as an illustrative example, store contact information associated with each contact entry of a communications identifier's corresponding contact list. For example, a contact list associated with a particular communications identifier may indicate contact identifiers for each contact of that contact list. For each contact identifier, contact information, such as, but not limited to, communications identifiers, additional contacts, group accounts, telephone numbers, location information, presence information, and the like, may be stored within storage/memory 254 of contact services system 228. Contact services system 228 may also include processor(s) 252, storage/memory 254, and communications circuitry 256.

Communications system 220 may also, in one embodiment, include a preferences system. Preferences system 224 may, in one embodiment, store information associated indicating which group accounts have granted a requesting group account with permission to establish a communications session with that group account. For example, upon a new contact being added to contact management system 228, a prompt may be provided to an individual to determine whether communication session privileges are allowed for that contact such that the contact may be able to establish a communications session with the individual (or other individuals associated with the shared electronic device) without requiring the individual to "accept" or "approve" the communications session. In some embodiments, the permission may be automated such that individuals that have granted permission to certain group accounts will be automatically stored by preferences system 224. When a user requests for contacts to be displayed, preferences system 224 may be accessed to obtain a list of group accounts that have authorized a particular group account associated with the request. Preferences system 224 may then provide a supplemental list, or list metadata, that indicates which group accounts stored within the contacts list of the communications account system 222 for the requesting device have granted the permission to the requesting group account. Preferences system 224 may also include processor(s) 252, storage/memory 254, and communications circuitry 256.

Communications system 220 may also, in one embodiment, include contact resolution system 232. Contact resolution system 232 may be configured to resolve, or attempt to resolve, a particular contact from a contact list. In particular, contact resolution system 232 may be configured to resolve one contact from two or more contacts that have been identified by ER system 278 during entity resolution processing. When a user speaks an utterance, such as "Call '<Contact Name>'," "Message <Contact Name>," and the like, audio data representing the utterance may first be provided to ASR system 258. ASR system 258 may generate text data representing the audio data such that the utterance is parsed into token text strings, such as "call" and "<Contact Name>," as well as an N-best list of token hypotheses. For each hypothesis, a corresponding confidence score may be attached indicated how confident ASR system 258 is that a particular hypothesis is a particular spoken word. NLU system 260 may then identify an intent and slot of the utterance based on the text data. For example, NLU system 260 may identify the intent of the utterance "Call 'Contact 1'" as being a call intent, and may further determine that the call intent has a "Contact Name" slot associated with it. Continuing the aforementioned example, the slot may be determined to have a value "Contact 1." Thus, ER system 278 may attempt to resolve the information attributed to the slot—{Contact Name}: "Contact 1"—to a specific entity. In one embodiment, contact resolution system 232 may host its own entity resolution system, contact services ER system 234, which may reside as part contact services system 228.

Communications system 220, in one embodiment, may include a contact database 238, which may be searched for contacts that are associated with the value attributed to the contact name slot. When a contact is added to an individual's contact list, that contact's information may be stored by contact database 238 and used by Contact services ER system 234 during entity resolution processing. For instance, ER system 278 may invoke Contact services ER system 234 for searching for contacts matching the text value. A contact list may be searched for the text value "Contact 1" to identify any contact entries from the contact list that substantially match the text value. In some embodiments, similar sounding words/names, double metaphones, and the like, as that of the text value may also be queried. For example, a contact named "Bob" may sound similar to a contact named "Rob," and therefore both "Bob" and "Rob" may be searched for within the contact list. As another example, a contact named "John" may also sound similar to another contact named "Jon," and therefore both "John" and "Jon" may be searched for within the contact list. The searching of the contact list within contact database 234 may result in a list of contact entries—an entry within the contact list associated with a particular contact name—as well as contact identifiers associated with those contact entries. Thus, ER system 278 may yield entity resolution results as contact identifiers likely corresponding to contact entries of the contact list whose contact name substantially matches the input text value attributed to the contact name slot.

Contact resolution system 232 may, in one embodiment, be responsible for obtaining contacts (e.g., contact identifiers) from contact services system 228. Contact services system 228 may store information for each of the contacts (e.g., communications identifiers, telephone numbers, group account information, etc.). If there are more than one contact identifier received by NLU system 260 (e.g., ER system 278 yields two or more contact identifiers), then disambiguation rules 236 of contact resolution system 232 may be invoked to process the contact identifiers from the entity resolution results. The various disambiguation processes included by disambiguation rules 236 may include filtering contact identifiers based on properties associated with the corresponding contact entries, contact information associated with the contact identifiers, and/or any other suitable criteria. For example, contact identifiers are associated with contact entries that had a confidence score from ASR system 258 of being less than a particular threshold (e.g., MEDIUM or LOW confidence score), may be removed from consideration. Contact identifiers that have previously been considered for contact resolution (e.g., part of a skip list) may be ignored. Furthermore, contact identifiers may be removed based on their communications information. For example, contact identifiers that are unassociated with communications identifiers of communications account system 222 may be removed from consideration. In one embodiment, contact identifiers that are determined to be ignored (e.g., not to be resolved to be the entity that the communications request is to be associated with) may also be added to a skip list. Thus, generally speaking, the goal of contact resolution system 232 is to return a single contact object (e.g., a communications identifier, telephone number, email address, etc.) to a speechlet/command processor such that the communications intent (e.g., a call intent) may be facilitated.

In some embodiments, communications system 220 may further include an index database 234. Index database 234 may store contact information obtained from contact database 238 in an indexed manner such that elastic searching, or any other type of searching, may be used to search for a particular contact. When an individual uploads contact information for a particular contact's entry, that information may be provided to both contact database 238 and index database 234. Index database 234 may parse the contact information into various categories capable of being searched using different search queries. For example, contact information associated with a first contact entry may include a first name, a last name, a group account, a telephone number, an email address, and the like. Index database 234 may parse the contact information into each respective element. Therefore, when a query is made (e.g., get contacts ("Bob")), each of the first name, last name, group account, telephone number, and email address may be searched for the value "Bob." Persons of ordinary skill in the art will recognize that any suitable indexing technique and query term may be employed by index database 234, and the aforementioned is merely exemplary.

Persons of ordinary skill in the art will recognize that although each of communications account system 222, preferences system 224, communications routing system 226, and contact services system 228 may each include instances of processor(s) 252, storage/memory 254, and communications circuitry 256, and those instances of processor(s) 252, storage/memory 254, and communications circuitry 256 within each of communications account system 222, preferences system 224, communications routing system 226, and contact services system 228 may differ.

Figure 3:
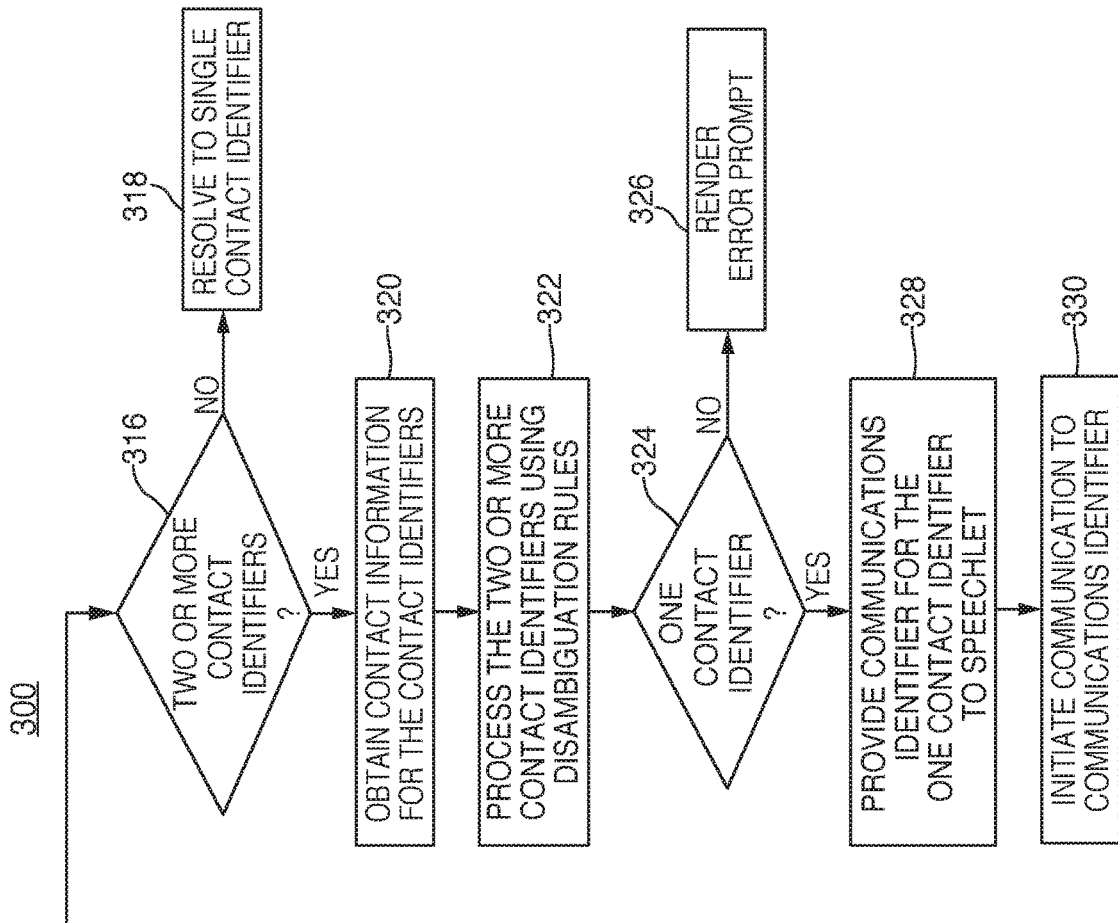
FIG. 3 is an illustrative flowchart of an exemplary process for performing contact resolution, in accordance with various embodiments.
Figure 4A:
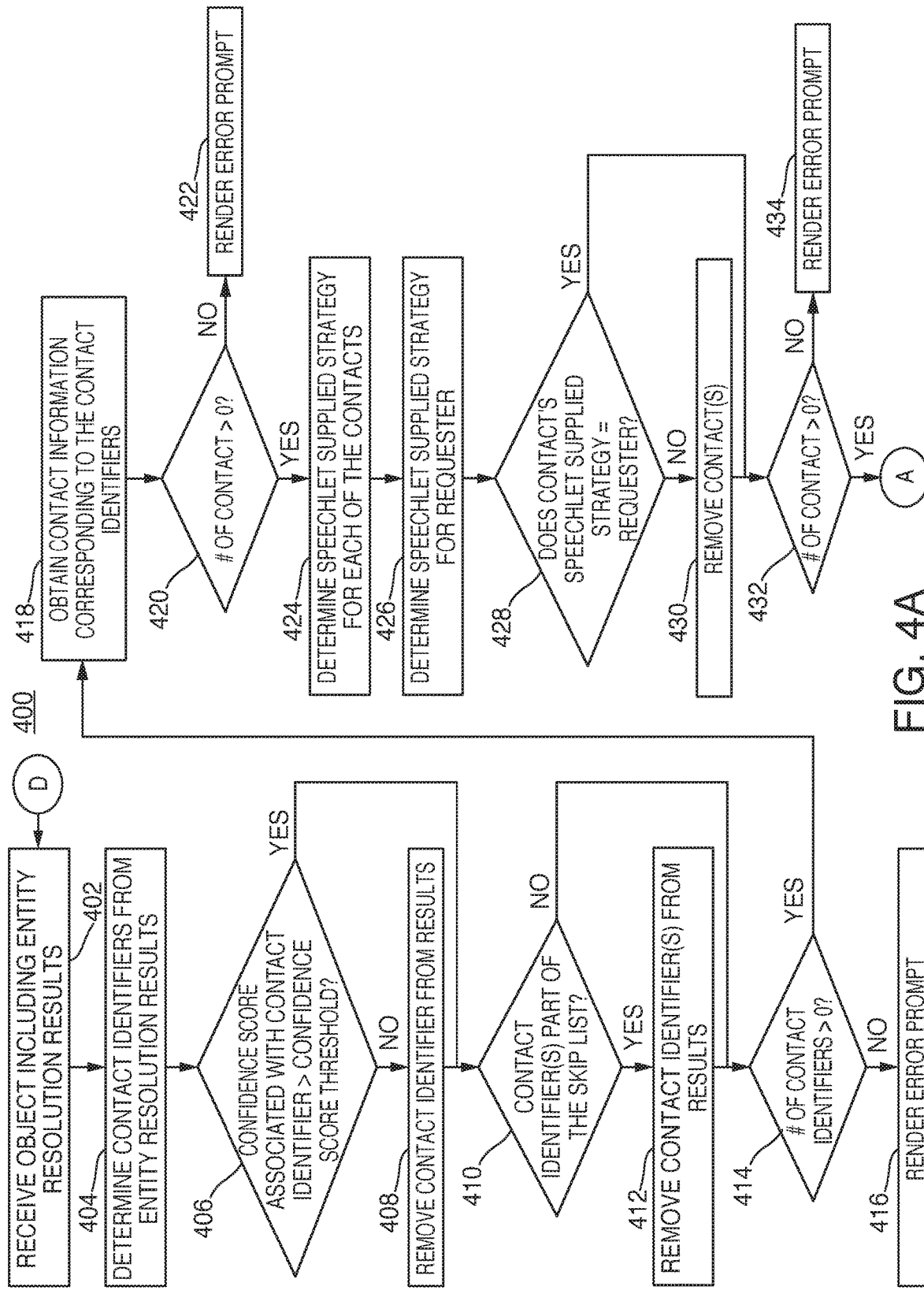
FIGS. 4A-D are illustrative flowchart of an exemplary process for resolving a contact by disambiguating between two or more contacts, in accordance with various embodiments.
Figure 4B:
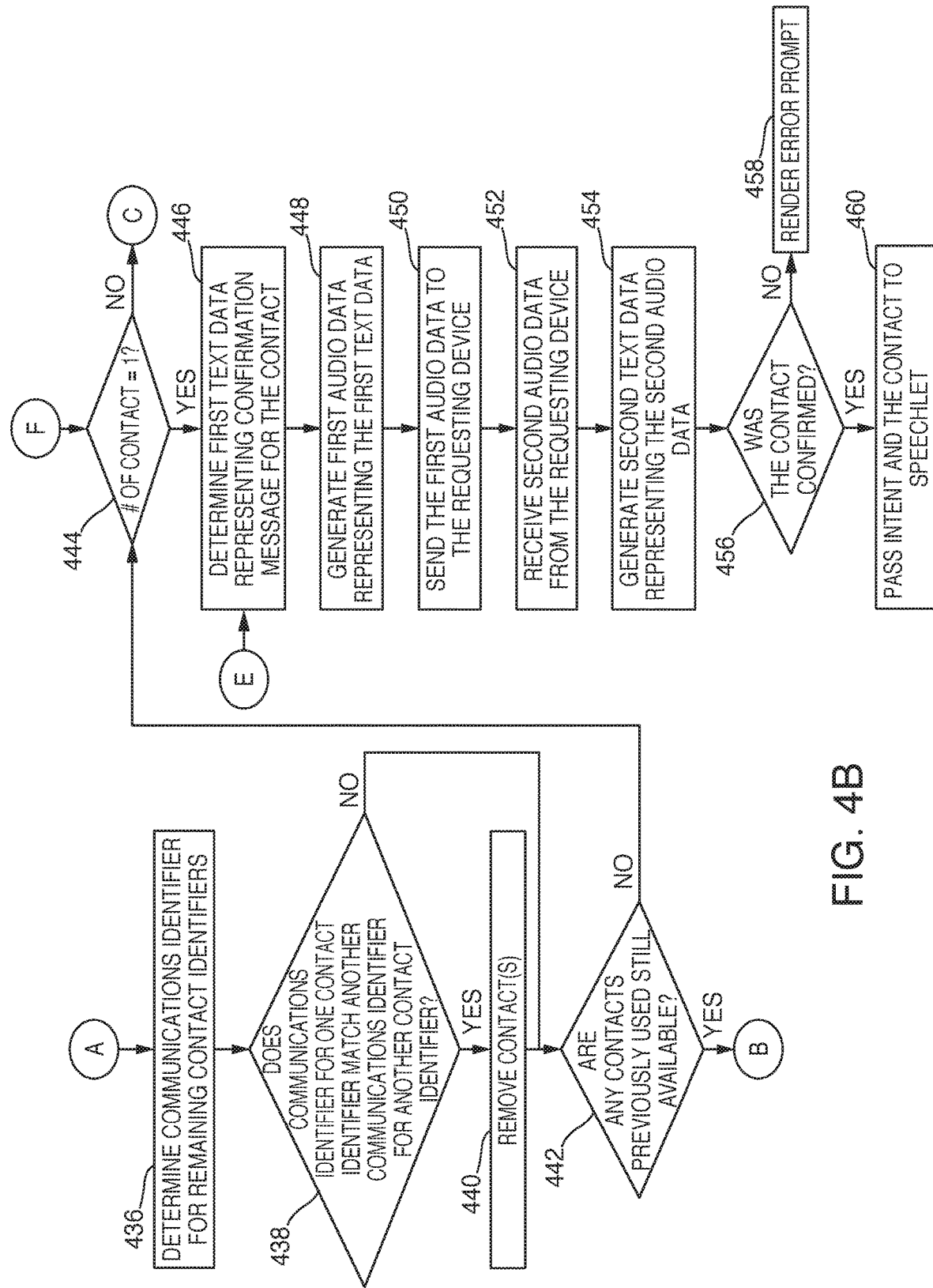
Figure 4C:
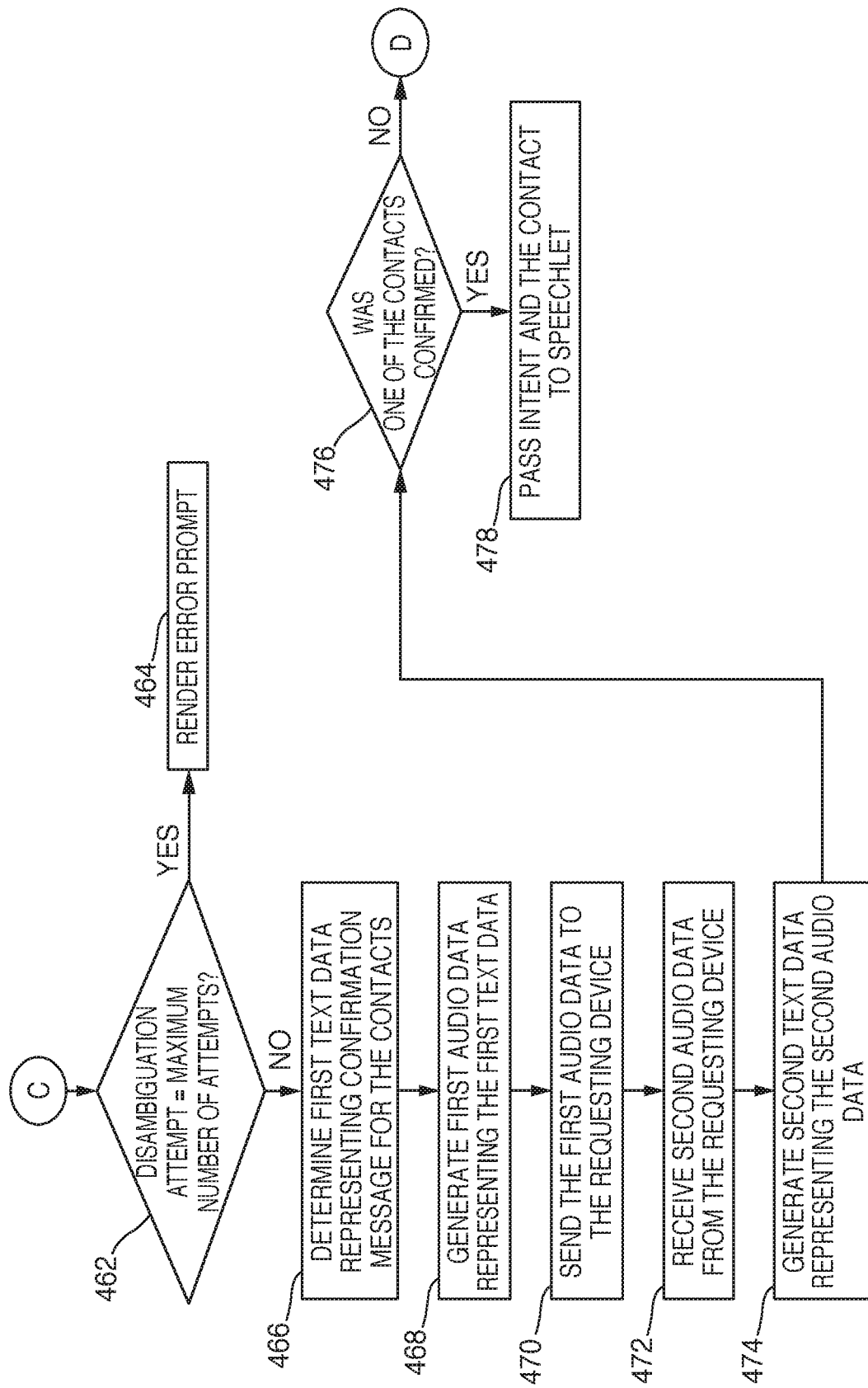
Figure 4D:
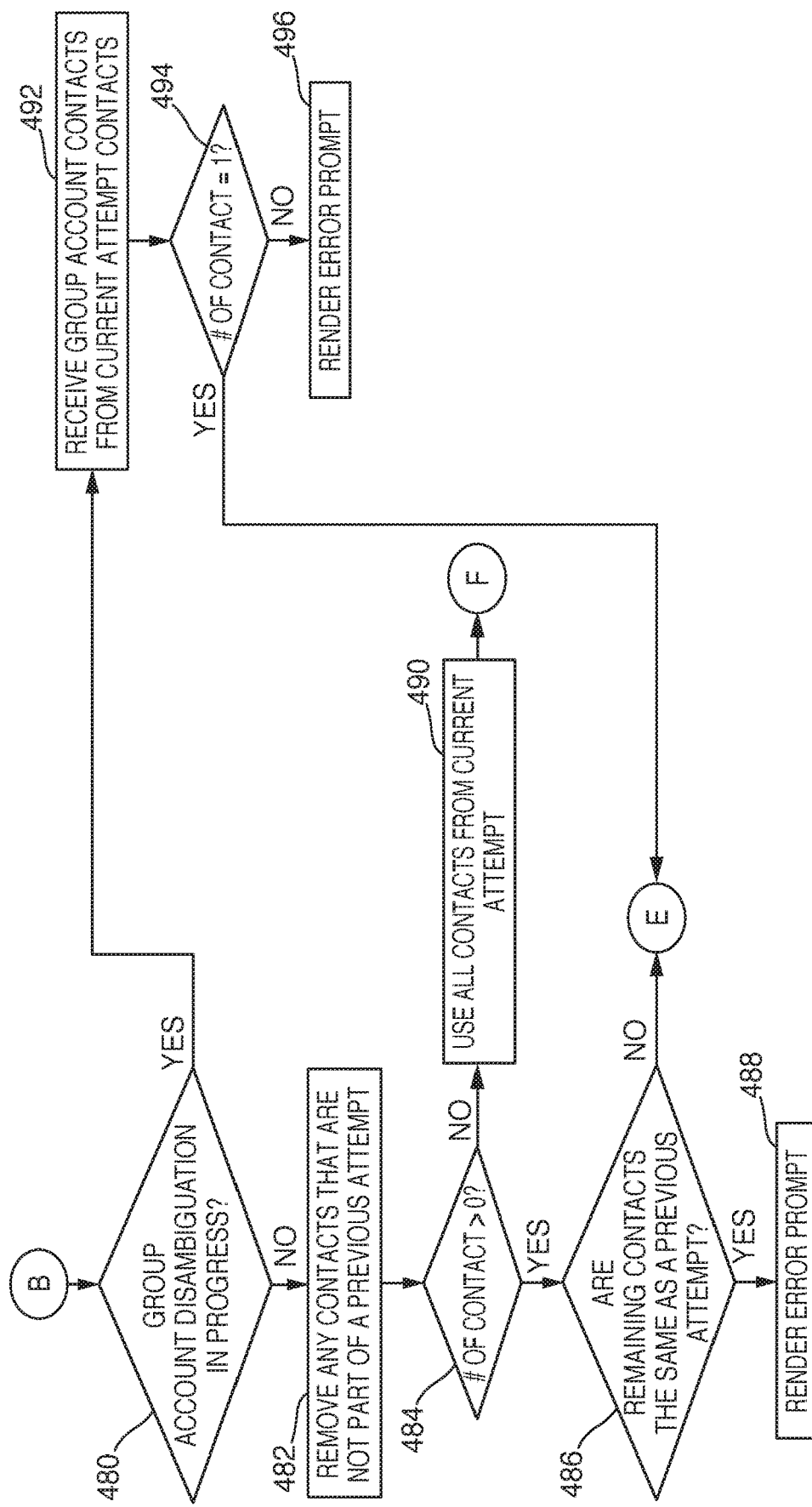

FIG. 3 is an illustrative flowchart of an exemplary process for performing contact resolution, in accordance with various embodiments. Process 300, in a non-limiting embodiment, may begin at step 302. At step 302, audio data representing an utterance may be received. For example, audio data representing utterance 4 may be received by computing system 200 from electronic device 100. Upon receipt, the audio data may be provided to ASR system 258.

At step 304, text data representing the audio data may be generated. For instance, ASR system 258 may generate the text data by tokenizing the audio data and assigning a confidence score to each of the tokens/hypotheses. The top N ranked hypotheses may by then be provided to NLU system 260. At step 306, NLU system 260 may determine that an intent of the utterance corresponds to a communications intent. For instance, the intent may be for a call, communications session, and/or message, for example, to be made to a particular contact. The intent may be determined by parsing and tagging portions of the text to particular grammatical objects (e.g., verbs, nouns, etc.), and then using those grammatical objects to determine a likely domain capable servicing that action. For instance, if the utterance includes the word "call," this may indicate a strong likelihood that a call function association with communications system 220 may be the intent of the utterance.

At step 308, one or more slots associated with the communications intent may be determined. For instance, a "call intent" (e.g., {Intent}: Call_Intent) may include a "contact name" slot (e.g., {Contact Name}), which indicates an intended recipient of the call. A value attributed to that slot from the parsed text data may also be determined. For example, if the utterance was, "Call 'Contact 1'," then the value attributed to the "contact name" slot may be "Contact 1" (e.g., {Contact Name}: "Contact 1"). At step 310, entity resolution may be invoked for the value attributed to the slot. In one embodiment, communications system 220 may host their own entity resolution service, such as contact services entity resolution system 234. Thus entity resolution system 278 of NLU system 260 may communicate with contact services entity resolution system 234 to resolve the information in the "contact name" slot to a particular entity.

At step 312, contact entries stored by contact database 238 for a contact list associated with the requester may be searched. In particular, the contact list may be queried for the value. The contact list may include a listing of contact entries each having a corresponding contact name, which may be compared with the value attributed to the contact name slot. In some embodiments, a confidence score indicating a likelihood that the value attributed to the "contact name" slot and a contact entry's corresponding contact name are equal may be generated. If the confidence score is greater than a confidence score threshold, then the corresponding contact entry may be identified as a "matching" the value. At step 314, probable contact identifiers associated with the contact entries having a confidence score exceeding the confidence score threshold may be returned. When a contact is added to the contact list, as stored by contact database 238, that contact's entry into the contact list may be assigned a unique contact identifier. During entity resolution processing, each contact entry of the contact list may be searched and compared against the text value attributed to any particular slot.

At step 316, a determination may be made as to whether two or more contact identifiers were returned at step 314. If, at step 316, it is determined that there is only one contact identifier returned, then process 300 may proceed to step 318. At step 318, the contact identifier that was identified may be used for resolving the contact to be used for the contact name slot. In some embodiments, contact services system 228 may access contact information for the contact identifier, which may then be used for communicating with that contact. As an illustrative example, if a single contact identifier is returned at step 314, then contact services system 228 may be employed to retrieve contact information, such as a telephone number or other communications identifier, which may then be provided to communications routing system 226 to facilitate the desired communications function (e.g., call, message, establish a communications session, etc.). Persons of ordinary skill in the art will recognize that, in some embodiments, no contact identifiers may be returned at step 314, and therefore instead of resolving to the single contact identifier, as described for step 318, additional processes may be invoked to attempt to resolve the contact. For example, if no contact identifiers are returned at step 314, then alternatively, at step 318, the requesting individual may be prompted to repeat the utterance, and process 300 may return to step 302 such that process 300 may repeat. As another example, if no contact identifiers are returned at step 314, then at step 318, an error prompt may be rendered (e.g., "I was unable to identify who 'Contact Name' is.").

If, at step 316, it is determined that two or more contact identifiers were returned as being probable contact identifiers (e.g., contact identifiers associated with contact entries whose names substantially match the value attributed to the contact name slot), then process 300 may proceed to step 320. At step 320, contact information for each of the contact identifiers may be obtained. For instance, contact services system 228 may be accessed to obtain contact information (e.g., telephone numbers, communications identifiers, group/user account information, etc.) associated with those contact identifiers. As an illustrative example, if two contact identifiers—"Contact ID 1" and "Contact ID 2"—are returned at step 314 as being probable contact identifiers for the value attributed to the slot, then contact services system 228 may be accessed to obtain contact information for these contact identifiers. For instance, "Contact ID 1" may have a first communications identifier associated with it, "Communications ID 1," while "Contact ID 1" may have a second communications identifier associated with it, "Communications ID 2."

At step 322, the two or more contact identifiers may be processed using one or more disambiguation rules. The disambiguation rules, which are described in greater detail below with reference to FIGS. 4A-D and FIG. 5, may attempt to filter the probable contact identifiers from two or more contact identifiers to a single contact identifier whose corresponding contact information may be used for communicating with that contact. Various mechanisms for disambiguating between two or more contact identifiers may include, but is not limited to, removing contact identifiers that are part of a skip list from consideration (e.g., contacts that have explicitly been indicated as being incorrect), removing contact identifiers based on contact information associated with those contacts, removing contact identifiers that are duplicates of other contact identifiers also being used for consideration, and the like. After processing the two or more contact identifiers using disambiguation rules 236, in one example embodiment, any remaining contact identifiers may be retained and process 300 may proceed to step 324.

At step 324, a determination may be made as to whether there is only one contact identifier remaining from the probable contact identifiers returned at step 314. In other words, at step 324 a determination is made as to whether disambiguation rules 236 were able to resolve the probable contact identifiers to a single contact identifier. If, at step 324, it is determined that a single contact identifier was not able to be resolved to, then process 300 may proceed to step 326. At step 326, an error prompt may be rendered. For example, an error message (e.g., "I was unable to identify that contact") may be provided to electronic device 100, and output to individual 2. In some embodiments, however, alternative steps may be taken if no contact identifiers remain at step 324. For example, the requesting individual (e.g., individual 2) may be prompted to repeat their request, and process 300 may repeat.

If, however, at step 324 it is determined that only one contact identifier remains, then process 300 may proceed to step 328. At step 328, a communications identifier for the one remaining contact identifier may be provided to the command processor, which may also be referred to as a "speechlet" to execute the desired function. For example, after disambiguation processing is performed to the two contact identifiers "Contact ID 1" and "Contact ID 2," only "Contact ID 1" may remain. In this particular scenario, the contact information associated with "Contact ID 1," "Communications ID 1," which was obtained from contact services system 228, as described above with reference to step 320, may be provided to the command processor to begin the process of invoking the specified communications function. At step 330, a communication to that communications identifier may be initiated. Continuing the previous example, a communication may be initiated by communications routing system 226 to "Communications ID 1."

FIGS. 4A-D are illustrative flowchart of an exemplary process for resolving a contact by disambiguating between two or more contacts, in accordance with various embodiments. Process 400, in a non-limiting embodiment, may begin at step 402. At step 402, an object including results from entity resolution may be received. For instance, the entity resolution results from Contact services ER system 234 may be obtained after searching contact database 238 and identifying the probable contact identifiers for the contact entries of an individual's contact list. In some embodiments, as mentioned previously, an individual may speak an utterance, "Call 'Contact 1'," and audio data representing the utterance may be provided to computing system 200, and in particular ASR system 258 of speech-processing system 250. ASR system 258 may generate text data representing the audio data, which may then be provided to NLU system 260. NLU system 260 may parse and tag the text into grammatical objects, and may determine that the intent of the utterance corresponds to a communications intent, such as a call intent. The call intent may include one or more slots, such as a contact name slot, which the object from the utterance may be attributed to. For example, the object "Contact 1" may be attributed to the contact name slot. ER system 278, and in particular its Contact services ER system 236 component, may then receive the contact name slot's value as the object associated with the entity resolution results. In the illustrative embodiment, an individual's contact list (e.g., a contact list associated with an account identifier linked to electronic device 100) may be accessed to determine which contact entries (e.g., entries in the contact list) are associated with the value.

At step 404, contact identifiers associated with the entity resolution results may be determined. For example, if the entity resolution results for the name "Bob" return contact entries for the contact names "Bob 1," "Bob 2," "Bob 3," etc., then the contact identifiers for each of these names may be determined (e.g., "Bob 1": Contact ID=1, "Bob 2": Contact ID=2, "Bob 3": Contact ID=3). As another example, if the entity resolution results for the name "Bob" return contact entries for the contact names "Bob," "Rob," and "Bobby," then contact identifiers for those names may be determined (e.g., "Bob": Contact ID=7, "Rob": Contact ID=22, "Bobby": Contact ID=15).

At step 406, a determination may be made as to whether a confidence score associated with a contact identifier is greater than a confidence score threshold. For instance, entity resolution processing may assign a particular confidence score to each entity resolution result. For example, if the value queried is "bob," and the result obtained is "Bob," then this may correspond to a confidence score of HIGH or 100%. As another example, if the value queried is "bob," and the result obtained is "John Bob," then this may result in a confidence score of MEDIUM or 60%. Still further, if the value queried is "bob," and one of the results obtained is "Rob," then the confidence score associated therewith may be MEDIUM or 50%, as "Rob" and "Bob" sound substantially similar to one another. If, at step 406, it is determined that a particular confidence score is less than the confidence score threshold, then process 400 may proceed to step 408, where the contact identifiers associated with contact entries having their respective confidence score being less than the confidence score threshold may be removed from the results. In other words, contact entries whose names are not highly likely to be the value used to query contact database 238 may be removed from consideration as an entity for the contact name slot. However, if at step 406 a particular confidence score or scores is/are determined to be greater than the confidence score threshold, then that contact may be retained, and process 400 may proceed to step 410. For purely illustrative purposes, two or more contact identifiers may remain at step 410, however persons of ordinary skill in the art will recognize that if, after step 408, only a single contact identifier remains, then that contact identifier may be provided to contact services system 228 to obtain a contact object (e.g., telephone number, communications identifier, etc.) to be used to facilitate the communication to that contact. Similarly, after step 408, process 400 may proceed to step 410. Thus, at step 410, those contact identifiers associated with contacts having a confidence score exceeding the confidence score threshold may remain.

At step 410, a determination may be made as to whether the contact identifiers are part of a skip list. The skip list, which is described in greater detail below, may correspond to a list of contact identifiers that may be removed from disambiguation processing as those contacts were previously indicates as being incorrect contacts for the value. For example, if contact resolution determines that, for the value "bob," the contact entries for names "Bobby" and "Bobby Jr." substantially match, then computing system 200 may generate audio data representing a message asking for an individual (e.g., individual 2) to select one of the contacts. If, at this point, the individual does not select one of the contacts, then those contact's corresponding contact identifiers may be added to the skip list such that, during a next attempt to resolve the contact entity, those contact identifiers are not used for disambiguation processing. Continuing the example above, a message asking, "Do you want to call 'Bobby' or 'Bobby Jr.'?" maybe provided to electronic device 100. If, in response to the message, individual 2 says, "No. Call 'Bob'," then the contact identifiers associated with the contact entries for "Bobby" and "Bobby Jr." may be added to the skip list.

If, at step 410, it is determined that a particular contact identifier associated with a particular contact is part of the skip list, then process 400 may proceed to step 412 where that contact identifier is, or the contact identifiers are, removed from the results. After step 412, process 400 may proceed to step 414. However, if at step 410 it is determined that one or more contact identifiers are not part of the skip list, then process 400 may proceed to step 414. At step 414, a determination may be made as to whether there are one or more contact identifiers remaining. If, at step 414, it is determined that there are no contact identifiers remaining after assessing the confidence score for the contact identifiers and the skip list, then process 400 may proceed to step 416, where an error prompt is rendered. For instance, the error prompt may indicate to the requesting individual that a contact was not able to be identified, and thus the request was unable to be fulfilled. As an illustrative example, the error prompt may be an error message "I'm sorry, I couldn't tell who you wanted to call," which may be sent to voice activated electronic device 100 from computing system 200 to indicate the error to individual 2. However, if at step 414 it is determined that one or more contact identifiers still remain, then process 400 may proceed to step 418.

At step 418, contact information corresponding to the contact identifiers may be obtained from contact services system 228. The contact information obtained at step 418 may include decrypted contact information associated each contact associated with a particular contact identifier. Various types of contact information that may be obtained for each contact identifier may include, but is not limited to, communications identifiers, group account information, telephone numbers, email addresses, mailing addresses, communication history for that contact, presence information, and the like. Therefore, based on the remaining contact identifiers after step 414, the contact information associated with those contact identifiers may be retrieved from contact services system 228.

At step 420, a determination may be made as to whether there are one or more contacts available. For instance, a particular contact identifier may include no contact information (e.g., a null contact), indicating that contact services system 228 may not include any contact information for that particular contact. Therefore, returning the contact information for that particular contact identifier may yield no data. Step 420, therefore, may allow communications system 220 to ensure that, of the remaining contact identifiers, at least one of the contact identifiers has contact information stored by contact services system 228. If, at step 420, it is determined that there is not one or more contacts available for the contact identifiers as stored by contact services system 228, then process 400 may proceed to step 422 where the error prompt is rendered. In some embodiments, step 422 may be substantially similar to step 416, and the previous description may apply. However, if at step 420 it is determined that there are one or more contacts available (e.g., contact information associated with at least one of the remaining contact identifiers), then process 400 may proceed to step 424. If some of the contact identifiers have contact information associated with them, while other do not, then those that do have contact information associated with them may be retained at step 420, and the contact information may be obtained from contact services system 228.

At step 424, a speechlet supplied strategy for each of the contacts remaining may be determined. For example, the speechlet supplied strategy may correspond to a rule by which communications between a requesting communications account and an identified contact may communicate. As an illustrative example, if one of the remaining contact identifier's communications information indicates that that contact is part of a group account, as indicated by communications account system 222, then this may indicate that this particular contact is capable of initiating and/or establishing communications sessions with other group accounts. At step 426, a speechlet supplied strategy for the requester (e.g., the requesting device's communications account) may be determined. For example, the requesting device may be configured to communicate with other devices that also may be using communications system 220. Thus, one speechlet supplied strategy may correspond to communications between two or more communications accounts of communications system 220. In some embodiments, if both the requester and a contact are part of group accounts on communications system 220 such that the requester and the contact may participate in a communications session with one another, then this may indicate that both the request and the contact have a same speechlet supplied strategy.

At step 428, a determination may be made as to whether or not the contact's speechlet supplied strategy equals the requester's speechlet supplied strategy. For example, a determination may be made as to whether both a contact identified at step 418 and 420, and the requester (e.g., individual 2) both have a communications account on communications system 220. If so, then process 400 may proceed to step 432. However, if any of the contacts remaining at step 420 do not have a same speechlet supplied strategy as that of the requester, then, at step 430, those contacts may be removed from consideration as possible destination communication addresses. After step 430, process 400 may also proceed to step 432.

At step 432, another determination may be made as to whether or not there are one or more contacts remaining after filtering out contacts based on speechlet supplied strategy. If, at step 432, it is determined that there are no more contacts left, then process 400 may proceed to step 434 where the error prompt may be rendered. In some embodiments, step 434 may be substantially similar to step 416, and the previous description may apply. However, if at step 432 it is determined that there are one or more contacts remaining, then process 400 may proceed to step 436. Persons of ordinary skill in the art will recognize that, in some embodiments, steps 424-432 may be skipped, and no speechlet supplied strategy filtering may be employed, and the aforementioned is merely exemplary.

At step 436, a communications identifier for each of the remaining contacts may be determined. For example, a communications identifier as stored by contact services 228 and/or communications account system 222 may be determined. The communications identifier may correspond to a unique identifier that indicates a communications account of communications system 220 associated with a particular contact identifier. In some embodiments, the communications identifier may enable a communications session and/or other communication may be facilitated between two or more communications accounts. At step 438, a determination may be made as to whether a communications identifier for one of the remaining contact identifiers match a communications identifier of another of the remaining contact identifiers. For instance, a determination may be made as to whether or not two or more of the remaining contact identifiers have a same communications identifier. If so, then this may indicate a duplicate contact entry, or two contacts that are both associated with the same communications identifier. As an illustrative example, if a household has two "Bobs," (e.g., "Bob Sr.," and "Bob Jr.,"), then each contact "Bob" may have a same communications identifier. In some embodiments, instead of, or in addition to, determining the communications identifiers for the remaining contact identifiers, a telephone number or other type of identifier for facilitating another type of communication may be obtained at step 436. In this particular scenario, at step 438 a determination may be made as to whether or not another contact identifier also has the same telephone number (or other identifier).

If, at step 438, it is determined that a communications identifier of the remaining contacts matches another remaining contact's communications identifier, then process 300 may proceed to step 440. At step 440, the duplicate communications identifier's corresponding contact identifier may be removed, or flagged as being duplicates of another remaining contact. After step 440, process 300 may proceed to step 442. However, if at step 438 it is determined that none of the remaining contact identifiers' communications identifiers match any of the other remaining contact identifiers' communications identifiers, then process 300 may proceed to step 442.

At step 442, a determination may be made as to whether or not any contacts previously used in a previous attempt to determine a contact by performing process 300 are available. For example, if the individual said, "Call 'Bob'," and contact identifiers for contact entries named "Bob 1" and "Bob 2" were identified, but the individual did not select either of those contacts, then these contacts may be considered previously used. In some embodiments, contact identifiers from the skip list and contact identifiers from a previous turn may differ in that contact identifiers added to the skip list may have been explicitly disclaimed by the individual when asked to be confirmed. If, at step 442, it is determined that there are contact identifiers from a previous turn, corresponding to previously identified contacts, then process 400 may proceed to step 480. However, if at step 442 it is determined that there are no contacts identified that were previously used, then process 400 may proceed to step 444.

At step 444, a determination may be made as to whether the number of contacts left is one contact. If there are more than one contact still remaining, as determined at step 444, then process 400 may proceed to step 462. However, if at step 444 it is determined that there is only one contact remaining, then process 400 may proceed to step 446.

At step 446, first text data representing a confirmation message for the one contact may be determined. For example, the text may be of the format: "Ok. Call <Contact Name>, right?", where the slot <Contact Name> is filled-in using the resolved entity of the remaining contact (e.g., {Contact Name}: "Bob"). At step 448, first audio data representing the first text data may be generated. For instance, TTS system 264 may receive the first text data, and may generate first audio data representing the first text data. At step 450, the first audio data may be sent to the requesting device. For example, the first audio data may be sent to electronic device 100 such that the confirmation message may be output by speaker(s) 210. At step 452, second audio data may be received from the requesting device by computing system 200, and in particular speech-processing system 250. The second audio data may represent sounds captured during a predefined amount of time (e.g., 2-5 seconds) after the first audio data is sent to the requesting device. If an individual says "Yes" or "No" to the confirmation message, then the second audio data should represent the corresponding utterance indicating that the correct contact was determined. At step 454, second text data representing the second audio data may be generated using ASR system 258. At step 456, a determination may be made as to whether the contact was confirmed. For instance, if the contact remaining at step 444 is named "Bob," the confirmation message may request that the individual confirm that the correct contact has been identified (e.g., "Call Bob, right?"). Therefore, one of two (or more) possible answers may be received—"Yes" or "No." If the individual uttered "Yes," then upon generating the second text data, NLU system 260 may determine that the contact name was confirmed. However, if the individual uttered "No," then NLU system 260 may determine that the contact name was not confirmed. If, at step 456, the contact name was not confirmed, then process 400 may proceed to step 458 where the error prompt may be rendered, as described previously with reference to step 416. However, if at step 456 it is determined that the contact was confirmed, then process 400 may proceed to step 460, where the intent and the contact may be passed to the speechlet such that communications routing system 226 may initiate the communications to the communications identifier associated with the contact identifier of the contact entry that was confirmed.

As mentioned previously, at step 444, a determination is made as to whether or not there is only one contact remaining after the various filtering steps. If not, process 400 may proceed from step 444 to step 462. At step 462, a determination is made as to whether a current disambiguation attempt corresponds to a maximum number of attempts for disambiguation. For instance, process 400 may be repeated a certain number of times in order to obtain a single contact identifier to be used for resolving the contact entity (e.g., communications identifier, telephone number, etc.) to be used for the communication intent. However, in order to prevent an endless loop, process 400 may be subject to a maximum number of iterations (e.g., three iterations). Therefore, if at step 462 it is determined that the current disambiguation attempt is a maximum attempt, then process 400 may proceed to step 464, where the error prompt may be rendered. In some embodiments, step 464 may be substantially similar to step 416, and the previous description may apply.

However, if at step 464 it is determined that the current attempt is not the maximum attempt, then process 400 may proceed to step 466. At step 466, first text data representing a confirmation message for the contacts that are remaining may be determined. For instance, if three contacts are remaining, "Contact 1," "Contact 2," and "Contact 3," then the confirmation message may be, "Who do you want to call: Contact 1, Contact 2, or Contact 3?" At step 468, first audio data representing the first text data may be generated. For example, the first text data representing the confirmation message may be sent to TTS system 264, which may generate first audio data representing the first text data. At step 470, the first audio data may be sent to the requesting device. At step 472, second audio data may be received from the requesting device. At step 474, second text data may be generated representing the second audio data. In some embodiments, steps 466-474 may be substantially similar to steps 446-454, with the exception that steps 466-474 may correspond to a confirmation message requesting a selection between multiple contacts, whereas steps 446-454 request confirmation for a single contact.

At step 476, a determination may be made as to whether one of the contact names was confirmed. For instance, the individual, in response to the first audio data being provided to the requesting device, may speak an utterance selecting one of the contacts. For example, the individual may utter, "Contact 1." This may indicate that the individual intended for "Contact 1" as the contact name to be communicated with. If, at step 476, it is determined that one of the contacts was confirmed, then process 400 may proceed to step 478, where the intent and the contact that was confirmed may be passed to the speechlet such that the communication to that contact's communications account may be initiated. In some embodiments, step 478 may be substantially similar to step 460, and the previous description may apply. However, if at step 478 it is determined that none of the contacts indicated in the confirmation message were confirmed (e.g., an individual says "No," or speaks a different name), then process 400 may return to step 402, where process 400 may repeat as a new attempt. Returning to step 402 may correspond to a single attempt at disambiguating a contact using process 400. In some embodiments, upon returning to step 402 after step 476, each of the contacts identified from step 444, and indicated by the confirmation message of step 466, may be placed into a skip list, or may be stored as being part of a previous turn. In some embodiments, if an individual explicitly indicates that one or more of the contact entries to be confirmed is incorrect, then that contact identifier, or contact identifiers, may be added to the skip list. In this way, contacts that have already been indicated as being incorrect may not be reused in an attempt to disambiguate the desired contact.

As mentioned previously, at step 442, a determination may be made as to whether any contacts previously used are still available. If there are not any contacts previously used still available, then process 400 may, in one embodiment, proceed to step 480. At step 480, a determination may be made as to whether group account disambiguation is in progress. Group account disambiguation, which is described in greater detail below with reference to FIG. 5, may correspond to a particular set of rules for disambiguating between two or more group accounts. For example, if an individual says "Call Bob's home," and there is both a contact named "Bob's home" and a contact named "Bob" that is part of another home's group account, then when contact services system 228 is invoked, both of these contact identifiers may be returned (e.g., a contact ID for "Bob" and a contact ID for "Bob's home"). If, at step 480, it is determined that group account disambiguation is in progress, then process 400 may proceed to step 492. At step 492, group account contacts from the current attempt contacts may be received. For instance, if three contacts remain at step 480, then the contacts that are group accounts may be retained. As an illustrative example, if there are three contacts remaining, and of the three only one corresponds to a group account, then the group account may be retained at step 492. At step 494, a determination may be made as to whether there is only a single contact remaining (e.g., the contact's group account). If not, then process 400 may proceed to step 496, where the error prompt may be rendered. However, if at step 494 it is determined that there is only a single contact remaining, then process 400 may proceed to step 446.

If, at step 480, it is determined that group account disambiguation is not in progress, then process 400 may proceed to step 482. At step 482, any contacts that are not part of a previous attempt may be removed from consideration. At step 484, a determination may be made as to where or not the number of contacts remaining is greater than zero contacts. If so, then process 400 may proceed to step 486. However, if at step 484 it is determined that there are no contacts remaining, then process 400 may proceed to step 490 where all contacts from the current attempt may be used. Process 400 may then proceed to step 444, which is described in greater detail above. At step 486, a determination may be made as to whether there are any remaining contacts that are the same as in a previous attempt. If not, then process 400 may proceed to step 446. However, if there are one or more contacts that remain that are the same as a previous attempt, then process 400 may proceed to step 488 where the error prompt may be rendered.

Figure 5:
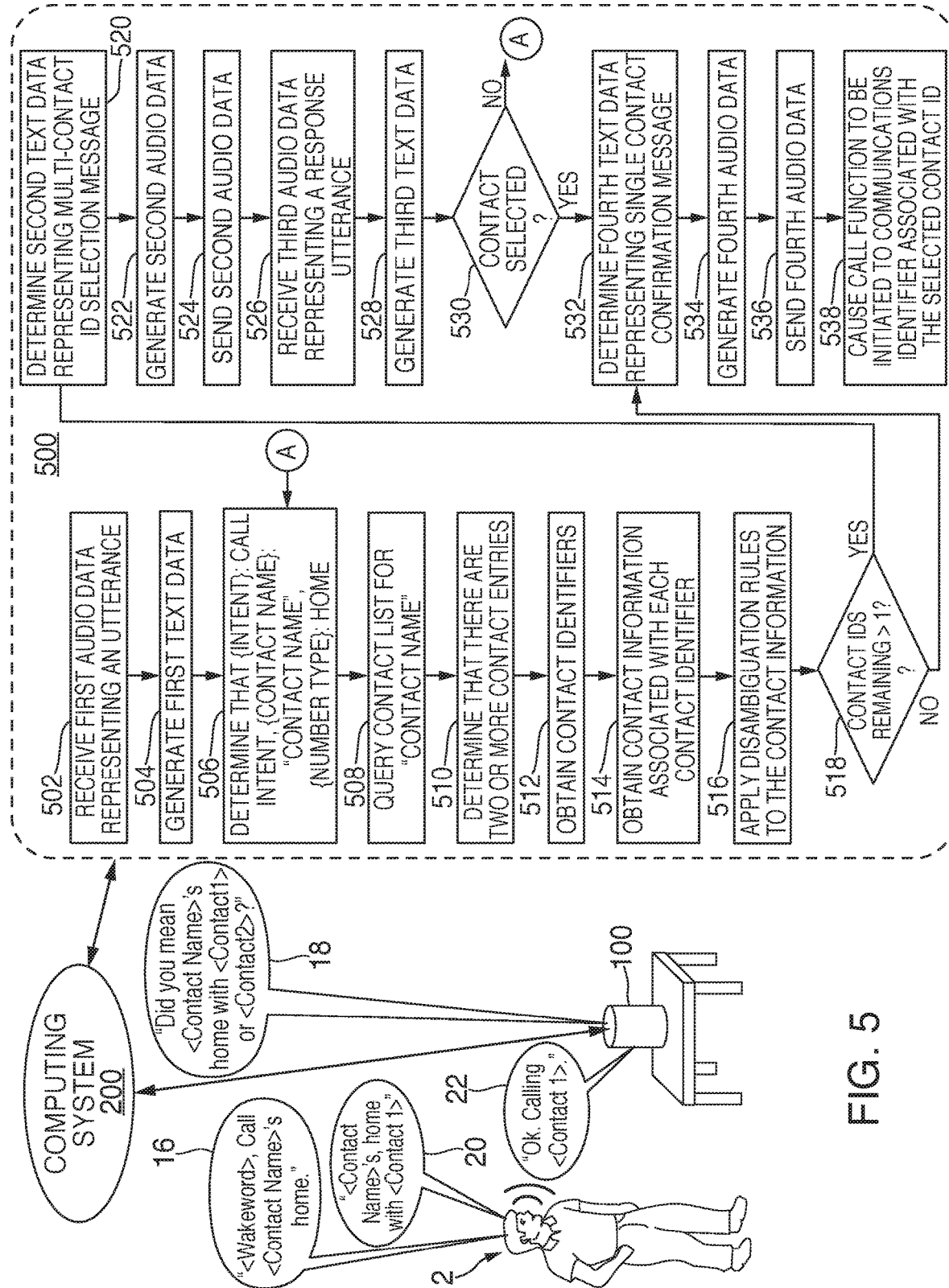
FIG. 5 is an illustrative diagram of an exemplary system for disambiguating between two or more group accounts, in accordance with various embodiments.

FIG. 5 is an illustrative diagram of an exemplary system for disambiguating between two or more group accounts, in accordance with various embodiments. In the non-limiting embodiment, individual 2 may speak an utterance 16 to their voice activated electronic device 100. The utterance may include a wakeword, which may subsequently be followed by a request to call a contact's home. For instance, utterance 16 may be "<Wakeword>, Call <Contact Name>'s home," where "<Wakeword>" corresponds to a wakeword for electronic device 100, and <Contact Name> corresponds to a particular contact that a call is to be initiated with. As an illustrative example, individual 2 may utter, "Alexa, Call John Smith's home," where "Alexa" may correspond to a wakeword, and "John Smith" may correspond to a contact's name.

If a contact list associated with electronic device 100, and thus individual 2, includes two or more contact entries that may be capable of being identified as the name included in utterance 16—<Contact Name>—then both of those contact entries may be returned to individual 2 for selection. Continuing the example above, if there are two "John Smith" contacts within a contact list, then computing system 200 may be unable to disambiguate between those two contacts. In this particular scenario, computing system 200 may generate a follow-up message that asks individual 2 to select one of these contact entries. In order for individual 2 to be able to differentiate between the two contact names, however, computing system 200 may obtain additional contact information associated with these contact entries, and that additional contact information may be used to assist in disambiguating the contacts. In some embodiments, the additional contact information may include a telephone number or other communications identifier associated with a particular contact, a location/address of a particular contact, a frequency with which that contact is communicated with, and/or other contacts that are associated with one the identified contacts. As an illustrative example, a contact list may include two separate contact entries associated with the name "John Smith." One of those contact entries may be part of a first group account, where the first group account also includes a contact named "Mary," whereas the other contact entry may be part of a second group account including a contact named "Jane." Therefore, in this particular example, computing system 200 may provide a message to electronic device 100 to ask which contact individual 2 is referring to, "Did you mean 'John Smith's' home with 'Mary' or 'Jane'?" More generally, computing system 200 may generate and send audio data representing a message 18, "Did you mean <Contact Name>'s home with <Contact 1> or <Contact 2>?" Persons of ordinary skill in the art will recognize that other additional information may be used to differentiate between the two or more contact entries. For example, a telephone number associated with those contact entries may be used. In this particular instance, the message may be "Did you mean <Contact Name>'s home with the phone number ending in <Contact ID 1's Last 4 Telephone Digits> or <Contact ID 2's Last 4 Telephone Digits>?" As another example, a location associated with those contact entries may be used. For instance, "Did you mean <Contact Name>'s home from <Contact ID 1's Location> or <Contact ID 2's Location>?" Further still, persons of ordinary skill in the art will recognize that if more than two contact entries are determined to correspond to the contact name identified by utterance 16, then additional information associated with each of those contact entries may be used to disambiguate, and the use of two contact entries is merely exemplary.

After message 18 is output by electronic device 100, individual 2 may speak a follow-up utterance 20 selecting one of the contacts. For example, individual 2 may say "Contact Name>'s home with <Contact 1>." In this particular scenario, because the individual indicated that he/she wants to communicate with the contact entry that includes the contact <Contact 1> (e.g., <Contact 1> may be a member of a group account of one of the contact entries identified by <Contact Name>), then computing system 200 may be able to use this information to select the proper contact identifier, and thus the proper communications identifier. Computing system 200 may then provide a message 22 to electronic device 100 to indicate to individual 2 that the communication is being initiated to the selected contact. For example, message 22 may be, "Ok. Calling," or "Ok. Calling <Contact Name>'s home with <Contact 1>."

Process 500 is an illustrative flowchart of a process that may be performed by computing system 200 for identifying and initiating a communication to a particular contact. Process 500, in a non-limiting embodiment, may begin at step 502. At step 502, first audio data representing an utterance may be received by computing system 200 from electronic device 100. For example, audio data representing utterance 16, "<Wakeword>, Call <Contact Name>'s home," may be received by computing system 200, and in particular, by speech-processing system 250. At step 504, first text data representing the first audio data may be generated. For instance, the audio data representing utterance 16 may be provided to ASR system 258 to generate the text data. The first text data may then be provided to NLU system 260 to determine an intent of the utterance.

At step 506, NLU system 260 may determine that an intent of utterance 16 corresponds to a call intent, a contact name slot corresponds to "Contact Name," and a number type slot corresponds to "Home." NLU system 260, as described previously with reference to FIG. 2, may parse and tag words from the text data to grammatical objects, and may use the tagged words to associate the text to certain slots for a particular intent. The intent, for example {Intent}: "Call Intent," may be identified by the verb "call," being tagged within the text data. The "Call Intent" may include, in one embodiment, one or more slots, such as a "Contact Name" slot {Contact Name}, and a "Number Type" slot {Number Type}. Each of these slots may have a word (or words) associated with them based on the various grammatical models associated with the call intent's corresponding domain. For instance, the identification of a name within the text data may indicate a contact name that the call intent is directed to, and the identification of the number type (e.g., "home," "cell," "mobile," "office," etc.) within the text may indicate a type of number to be called for that contact. Therefore, NLU system 260 may determine that the intent of utterance 16 is for a call to be placed to a contact's home number, the contact being identified as "Contact Name." The task now, therefore, may be to determine which contact from a contact list associated with individual 2 the name "Contact Name" is associated with, and what that particular contact's home number is.

At step 508, a contact list may be queried for the value attributed to the contact name slot. For example, the value attributed to the contact name slot via NER system 272 and IC system 274 may be "Contact Name" (e.g., {Contact Name}: "Contact Name"). Therefore, each entry in the contact list may be compared to that value to determine whether or not any particular contact entry, or entries, substantially match the value. For example, a confidence score indicating a likelihood that any one particular contact entry's contact name is equal to the value may be generated, and a determination may be made as to whether the confidence score is greater than a confidence score threshold. If so, then that may indicate that the contact entry's contact name substantially matches the value attributed to the contact name slot.

At step 510, it may be determined that there are two or more contact entries within the contact list that substantially match the contact name slot's value. For example, if the value attributed to the contact name slot is "Bob," and there are contact entries for "Bob" and "Bobby," then ER system 278 may determine that there are two contact entries substantially matching the contact name slot's value. In particular, it may be determined at step 510 that there are two or more contact entries substantially matching the contact name slot's value and including a number type matching the number type slot's value (e.g., {Number Type}: "Home"). At step 512, contact identifiers associated with the two or more contact entries may be obtained. The contact identifiers may correspond to unique indexing identifiers assigned to each contact entry when that contact entry is added to the contact list, as stored by contact database 238. If there are N contact entries determined to match the contact name slot's value, then N contact identifiers may be obtained (e.g., "Contact ID 1," "Contact ID 2," . . . , "Contact ID N"). In some embodiments, step 512 may be substantially similar to step 314 of FIG. 3 with the exception that at step 512 a value attributed to a number type slot is also employed. However, persons of ordinary skill in the art will recognize that the aforementioned is merely exemplary.

At step 514, contact information associated with each of the contact identifiers that were obtained may also be obtained. The contact information may include information stored by contact services system 228 for each contact identifier. For example, telephone numbers or other communications identifiers for a particular contact identifier may be obtained. As another example, addresses and/or location information for a particular contact identifier may be obtained. As yet another example, a group account that the contact identifier is associated with may be determined, and additional members of that group account may also be determined. In this particular instance, the contact identifier may be used to obtain a communications identifier, which may indicate a group account on communications account system 222 that the particular communications identifier is associated with. That group account may include two or more user accounts (e.g., members) who also have their own communications identifiers also associated with that group account. A contact name for each of the communications identifiers associated with the particular contact identifier's corresponding communications identifier, as identified from the communications information, may then also be obtained. As still yet another example, the communications information may include images/videos that are associated with a particular contact identifier, such as profile pictures, pictures stored for that contact identifiers communications account, and/or pictures associated with one or more social media platforms associated with that contact identifier.

At step 516, disambiguation rules 236 may be applied to the contact information. Disambiguation rules 236 may attempt to reduce the number of contact identifiers from those obtained at step 512. For instance, contact identifiers that have already been considered, are part of a skip list, and/or are duplicates of other obtained contact identifiers, may be removed from consideration within process 500 by contact resolution system 232. In some embodiments, disambiguation rules 236 may use the contact information obtained at step 514 to remove contact identifiers from consideration. For example, a disambiguation rule of disambiguation rules 236 may be to remove contact identifiers that are unassociated with a group account. Therefore, using the contact information obtained for the contact identifiers, a determination may be made as to which contacts are associated with a group account.

At step 518, a determination may be made as to whether more than one contact identifier still remains. If not, process 500 may proceed to step 532. However, if so, then process 500 may proceed to step 520. At step 520, second text data representing a multi-contact identifier selection message may be determined. The multi-contact identifier selection message may correspond to a message that requests that a selection be made between one of two or more contact identifiers based on a contact name associated with those contact identifiers. For example, message 18 may be an exemplary multi-contact identifier selection message requesting that a selection of one contact from two or more contacts be provided. As an illustrative example, message 18 may be "Did you mean <Contact Name>'s home with <Contact 1> or <Contact 2>?" At step 522, second audio data representing the second text data may be generated. For instance, TTS system 264 may receive the second text data and may generate second audio data by performing text-to-speech processing to the second text data. At step 524, the second audio data may be sent to electronic device 100 such that the multi-contact identifier selection message may be output.

At step 526, third audio data representing a response utterance 20 may be received by computing system 200. For example, in response to message 18, individual 2 may speak utterance 20, "<Contact Name>'s home with <Contact 1>." Similarly to step 502, the third audio data may also be provided to ASR system 258 upon receipt. At step 528, third text data representing the third audio data may be generated. For instance, ASR system 258 may generate the third text data by performing speech-to-text processing to the third audio data.

At step 530, a determination may be made as to whether a contact from the multi-contact identifier selection message has been selected. For example, using the third text data, a determination may be made as to whether individual 2 spoke an utterance indicating that one of the contact identifiers remaining at step 518 be selected. In some embodiments, NLU system 260 may generate a similarity score indicating a likelihood that the response utterance includes a contact name for a contact entry associated with a remaining contact identifier. For instance, NLU system 260 may know that, of the remaining contact identifiers, the contact names for those corresponding contact identifiers are "Contact 1" and "Contact 2," and therefore a response utterance selecting one of those two contact identifiers may be of the format, "<Contact Name>'s home with <Contact 1>" or "<Contact Name>'s home with <Contact 2>," amongst other possible sample utterance frameworks. If the similarity score that is generated exceeds a particular similarity score threshold, then this may indicate that one of the contact identifiers has positively been identified. In this particular scenario, process 500 may proceed to step 532, which is described in greater detail below. However, if the similar score is less than or equal to a particular similarity score threshold, then this may indicate that none of the remaining contact identifiers have been selected. In this particular scenario, process 500 may return to step 506, where an intent, and various slots for that intent, may be determined using the third text data.

At step 532, fourth text data representing a single contact information message may be determined. For instance, single contact confirmation message 22 may be determined to indicate that a call (or other type of communication) is going to be made. For example, confirmation message 22 may be, "Ok. Calling <Contact 1>." At step 534, fourth audio data representing the fourth text data may be generated. For instance, TTS system 264 may generate fourth audio data representing the fourth text data by performing text-to-speech processing to the fourth text data. At step 536, the fourth audio data may be sent to electronic device 100. At step 548, a call function may be caused to be initiated to the communications identifier associated with the selected contact identifier. In one embodiment, the communications identifier associated with the contact identifier from step 514 may be used, and provided to a command processor and/or communications routing system 226 such that a call function, or other type of communication, may be initiated to communicate with the selected contact.

The various embodiments of the invention may be implemented by software, but may also be implemented in hardware, or in a combination of hardware and software. The invention may also be embodied as computer readable code on a computer readable medium. The computer readable medium may be any data storage device that may thereafter be read by a computer system.

The above-described embodiments of the invention are presented for purposes of illustration and are not intended to be limiting. Although the subject matter has been described in language specific to structural feature, it is also understood that the subject matter defined in the appended claims is not necessarily limited to the specific features described. Rather, the specific features are disclosed as illustrative forms of implementing the claims.

What is claimed is:

1. A method, comprising:
   receiving, at a computing system, first audio data representing a first utterance requesting that a first communications session be established with a contact, the first audio data being received from a first electronic device corresponding to a first account identifier;
   generating first text data representing the first audio data;
   determining that the first utterance corresponds to a communications intent, the communications intent including a contact name slot to be resolved;
   determining, using the first text data, a first text value associated a portion of the first utterance corresponding to the contact, the first text value to be used for resolving an entity for the contact name slot;
   accessing a contact list associated with the first account identifier;
   determining that there is a first contact entry from the contact list that substantially matches the first text value;
   determining that there is a second contact entry from the contact list that substantially matches the first text value;
   determining a first contact identifier associated with the first contact entry;
   determining a second contact identifier associated with the second contact entry;
   determining that a contact identifier skip list includes the second contact identifier indicating that the second contact identifier is to be removed from consideration as a possible value to be associated with the contact name slot, the contact identifier skip list corresponding to at least one contact identifier associated with a corresponding contact entry from the contact list that has been determined to substantially match the first text value and indicated by a user as differing from the contact;
   determining second text data representing a message asking for the first contact entry to be confirmed;
   generating second audio data representing the second text data; and
   sending the second audio data to the first electronic device.

2. The method of claim 1, further comprising:
   receiving, at the computing system, and prior to the first audio data being received, third audio data representing a second utterance requesting that a second communications session be established with the contact, the third audio data being received from the first electronic device;
   generating third text data representing the third audio data;
   determining that the second utterance corresponds to the communications intent;
   determining, using the third text data, that the first text value is associated with the portion;
   accessing the contact list;
   determining that the second contact entry substantially matches the first text value;
   determining fourth text data representing a confirmation message asking whether the second contact entry is an intended contact for establishment of the second communications session;
   generating fourth audio data representing the fourth text data;
   sending the fourth audio data to the first electronic device;
   receiving, at the computing system, fifth audio data representing a response utterance to the confirmation message, the fifth audio data being received from the first electronic device;
   generating fifth text data representing the fifth audio data;
   determining, using the fifth text data, that the second contact entry is different than the contact; and
   adding the second contact identifier to the contact identifier skip list such that a subsequent request to establish a third communications session with the contact that identifies the second contact entry causes the second contact entry to be removed from consideration.

3. The method of claim 1, further comprising:
   determining, prior to determining that the contact identifier skip list includes the second contact identifier, that there is a third contact entry from the contact list that substantially matches the first text value;
   determining a third contact identifier associated with the third contact entry;
   obtaining first contact information associated with the first contact identifier, the first contact information indicating a first group account on a communications system associated with the computing system that a first contact associated with the first contact entry is a member of;
   obtaining second contact information associated with the third contact identifier, the second contact information indicating that a second contact associated with the third contact entry is unassociated with any group accounts on the communications system; and determining that the first communications session to be established with the contact is only to be made to contacts that are members of a group account, such that the third contact identifier is removed from consideration because the second contact information indicates that the second contact is unassociated with any group accounts.

4. The method of claim 1, further comprising:

determining, prior to determining that the contact identifier skip list includes the second contact identifier, that there is a third contact entry from the contact list that substantially matches the first text value;

determining a third contact identifier associated with the third contact entry;

obtaining first contact information associated with the first contact identifier, the first contact information indicating a first group account on a communications system associated with the computing system that a first contact associated with the first contact entry is a member of;

obtaining second contact information associated with the third contact identifier, the second contact information indicating that a third contact associated with the third contact entry is an additional member of the first group account;

determining that the first contact entry and the third contact entry are likely duplicate contact entries based on the first contact entry and the third contact entry both substantially matching the first text value and both the first contact entry and the third contact entry being members of the first group account; and removing the third contact identifier from consideration as the entity.

5. A method, comprising:

receiving, from a first device associated with a first identifier, first audio data representing a first utterance;

determining that the first audio data corresponds to an intent to communicate with a contact;

determining a portion of the first audio data corresponds to first data to be used for resolving an entity;

determining a first contact list associated with the first identifier, the first contact list comprising at least a first entry represented by a first contact name value and a second entry represented by a second contact name value;

selecting the first entry based at least in part on the first data;

selecting the second entry based at least in part on the first data;

determining that a first skip list comprises the second entry, the first skip list comprising contact entries to be ignored;

determining first text data requesting confirmation of at least the first entry;

generating, in response to the first text data being determined, second audio data representing the first text data; and sending the second audio data to the first device.

6. The method of claim 5, prior to the first audio data being received, further comprising:

receiving, a second request to communicate with the contact;

determining that the first contact list comprises the second entry;

determining second text data requesting confirmation of the second entry;

generating third audio data representing the second text data;

sending the third audio data to the first device;

receiving fourth audio data representing a second utterance comprising a response to the third audio data;

determining that the fourth audio data represents an indication that the second entry differs from the contact; and determining the second entry is to be maintained on the first skip list.

7. The method of claim 5, further comprising:

receiving, from the first device, third audio data representing a second utterance comprising a response to the second audio data;

generating second text data representing the third audio data;

determining, using the second text data, that the first entry has been confirmed; and causing a communication session to be initiated with a first communications identifier associated with the first entry.

8. The method of claim 5, further comprising:

determining, prior to determining that the first skip list comprises the second entry, that the first contact list comprises a third entry represented by a third contact name value;

selecting the third entry based at least in part on the first data;

receiving first contact information associated with the first entry, second contact information associated with the second entry, and third contact information associated with the third entry;

determining that the third entry is a duplicate of the first entry based, at least in part, on the first contact information and the third contact information both comprising a same communications identifier; and determining that the third entry is to be ignored.

9. The method of claim 5, further comprising:

determining, prior to the first skip list being determined to comprise the second entry, a first confidence score indicating a first likelihood that the first contact name value comprises the first data;

determining a second confidence score indicating a second likelihood that the second contact name value comprises the second first data; and determining that the first confidence score and the second confidence score both exceed a predefined confidence score threshold indicating that both the first contact name value and the second contact name value substantially match the first data.

10. The method of claim 5, further comprising:

receiving, from the first device, a second request to communicate with the contact;

determining that the first entry differs from the contact;

determining that a maximum number of attempts to resolve the contact have been performed; and rendering an error prompt for the first device.

11. The method of claim 5, further comprising:

receiving third audio data representing a second utterance comprising a response to the second audio data;

generating second text data representing the third audio data;

determining, the second text data indicates that the first entry differs from the contact;

adding the first entry to the first skip list;

determining, based at least in part on the first skip list comprising the first entry and the second entry, third text data indicating that the contact is unable to be resolved;

generating fourth audio data representing the third text data; and sending the fourth audio data to the first device.

12. The method of claim 5, further comprising:

determining, prior to the first skip list being determined to comprise the second entry, that the first contact list comprises a third entry represented by a third contact name value;

selecting the third entry based at least in part on the first data;

receiving first contact information associated with the first entry, second contact information associated with the second entry, and third contact information associated with the third entry;

determining, based at least in part on the third contact information, a number of communications with a communications identifier associated with the third entry;

causing, based at least in part on the number of communications being less than a predefined communication activity threshold, that the third entry is infrequently communicated with; and adding the third entry to the first skip list.

13. A computing system, comprising:

at least one processor;

communications circuitry; and memory including instructions operable to be executed by the at least one processor to configure the system to:

receive, from a first device associated with a first identifier, first audio data representing a first utterance;

determine that the first audio data corresponds to an intent to communicate with a contact;

determine a portion of the first audio data corresponds to a first data to be used for resolving an entity;

determine a first contact list associated with the first identifier, the first contact list comprising at least a first entry represented by a first contact name value and a second entry represented by a second contact name value;

select the first entry based at least in part on the first data;

select the second entry based at least in part on the first data;

determine that a first skip list comprises the second entry, the first skip list comprising entries to be ignored;

determine first text data requesting confirmation of at least the first entry;

generate, in response to the first text data being determined, second audio data representing the first text data; and send the second audio data to the first device.

14. The computing system of claim 13, wherein the memory further comprises instructions that prior to the first audio data being received, further configure the system to:

receive, a second request to communicate with the contact;

determine that the first contact list comprises the second entry;

determine second text data requesting confirmation of the second entry;

generate third audio data representing the second text data;

send the third audio data to the first device;

receive fourth audio data representing a second utterance comprising a response to the third audio data;

determine the fourth audio data represents an indication that the second entry differs from the contact; and determine the second entry is to be maintained on the first skip list.

15. The computing system of claim 13, wherein the at least one processor is further operable to:

determine, prior to the first skip list being determined to comprise the second entry, that the first contact list comprises a third entry represented by a third contact name value;

select the third entry based at least in part on the first data;

receive first contact information associated with the first entry, second contact information associated with the second entry, and third contact information associated with the third entry;

determine that the third entry is a duplicate of the first entry based, at least in part, on the first contact information and the third contact information both comprising a same communications identifier; and determine that the third entry is to be ignored.

16. The computing system of claim 13, wherein the at least one processor is further operable to:

determine, prior to the first skip list being determined to comprise the second entry, a first confidence score indicating a first likelihood that the first contact name value comprises the first data;

determine a second confidence score indicating a second likelihood that the second contact name value comprises the first data; and determine that the first confidence score and the second confidence score both exceed a predefined confidence score threshold indicating that both the first contact name value and the second contact name value substantially match the first data.

17. The computing system of claim 13, wherein the at least one processor is further operable to:

receive, from the first device, a second request to communicate with the contact;

determine that the first entry differs from the contact;

determine that a maximum number of attempts to resolve the contact have been performed; and render an error prompt for the first device.

18. The computing system of claim 13, wherein the memory further comprises instructions that further configure the system to:

receive third audio data representing a second utterance comprising a response to the second audio data;

generate second text data representing the third audio data;

determine, the second text data indicates the first entry differs from the contact;

add the first entry to the first skip list;

determine, based at least in part on the first skip list comprising the first entry and the second entry, third text data indicating that the contact is unable to be resolved;

generate fourth audio data representing the third text data; and send the fourth audio data to the first device.

19. The computing system of claim 13, wherein the at least one processor is further operable to:

determine, prior to the first skip list being determined to comprise the second entry, that the first contact list comprises a third entry represented by a third contact name value;

select the third entry based at least in part on the first data;

receive first contact information associated with the first entry, second contact information associated with the second entry, and third contact information associated with the third entry;

determine, based at least in part on the third contact information, a number of communications with a communications identifier associated with the third entry;

cause, based at least in part on the number of communications being less than a predefined communication activity threshold, that the third entry is infrequently communicated with; and add the third entry to the first skip list.

* * * * *